US011941639B1

(12) United States Patent
Chheda et al.

(10) Patent No.: US 11,941,639 B1
(45) Date of Patent: Mar. 26, 2024

(54) BEST PRACTICE ANALYSIS AS A SERVICE

(71) Applicant: Amazon Technologies, Inc., Seattle, WA (US)

(72) Inventors: Mahendra M. Chheda, Sammamish, WA (US); Shawn E. Heidel, Everett, WA (US); Robert J. Jaye, Sammamish, WA (US); Justin K Brindley-Koonce, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 643 days.

(21) Appl. No.: 16/895,789

(22) Filed: Jun. 8, 2020

Related U.S. Application Data

(62) Division of application No. 13/479,146, filed on May 23, 2012, now Pat. No. 10,740,765.

(51) Int. Cl.
*G06Q 30/00* (2023.01)

(52) U.S. Cl.
CPC .................................... *G06Q 30/00* (2013.01)

(58) Field of Classification Search
CPC ............... G06Q 10/06; G06Q 30/0621; G06Q 10/06375; G06Q 30/00; G06Q 10/00
See application file for complete search history.

(56) References Cited

U.S. PATENT DOCUMENTS 6,909,992 B2 6/2005 Ashley
7,292,969 B1 11/2007 Aharoni et al.
7,317,699 B2 1/2008 Godfrey et al.
7,552,365 B1 6/2009 Marsh et al.
7,568,017 B2 7/2009 Shah et al.
7,640,342 B1 12/2009 Aharoni et al.
7,653,008 B2 1/2010 Patrick et al.
(Continued)

FOREIGN PATENT DOCUMENTS

JP 09258999 10/1997

OTHER PUBLICATIONS

3. Violino, B. (2005). IT frameworks demystified. Network World, 22(7), S18-S18,S20 (Year: 2005).*
(Continued)

*Primary Examiner* — Maria C Santos-Diaz
(74) *Attorney, Agent, or Firm* — Kilpatrick Townsend & Stockton LLP

(57) ABSTRACT

Embodiments of the present disclosure are directed to, among other things, providing resource allocation advice, configuration recommendations, and/or migration advice regarding data storage, access, placement, and/or related web services. In some examples, a web service may utilize or otherwise control a client instance to control, access, or otherwise manage resources of a distributed system. Based at least in part on one or more resource usage checks and/or configuration checks, resource usage information and/or configuration information of an account utilizing a web service, and/or user preferences and/or settings, resource allocation advice, system configuration recommendations, and/or migration advice may be provided to a user of an account. Additionally, in some examples, one or more remediation operations may be performed automatically.

20 Claims, 21 Drawing Sheets

(56) References Cited

U.S. PATENT DOCUMENTS

| | | | |
|---|---|---|---|
| 7,822,787 B2 | 10/2010 | Saika | |
| 7,886,341 B2 | 2/2011 | Lin et al. | |
| 7,996,787 B2 | 8/2011 | Reveman | |
| 8,095,764 B1 | 1/2012 | Bauer et al. | |
| 8,290,822 B2 | 10/2012 | Gade et al. | |
| 8,296,615 B2 | 10/2012 | Rajamony et al. | |
| 8,375,180 B2 | 2/2013 | Chiu et al. | |
| 8,401,975 B1 | 3/2013 | Tian et al. | |
| 8,448,171 B2 | 5/2013 | Donnellan et al. | |
| 8,612,577 B2 | 12/2013 | Ferris et al. | |
| 8,769,059 B1 | 7/2014 | Chheda et al. | |
| 8,805,975 B2 | 8/2014 | Schwimer et al. | |
| 8,819,198 B2 | 8/2014 | Schwimer et al. | |
| 8,903,992 B2 | 12/2014 | Huang | |
| 8,954,574 B1 | 2/2015 | Chheda et al. | |
| 9,197,502 B1 | 11/2015 | Chheda et al. | |
| 9,219,648 B1 | 12/2015 | Chheda et al. | |
| 9,455,871 B1 | 9/2016 | Chheda et al. | |
| 2002/0032764 A1 | 3/2002 | Ishikawa et al. | |
| 2002/0087591 A1 | 7/2002 | Reynar et al. | |
| 2002/0118809 A1 | 8/2002 | Eisenberg | |
| 2002/0138431 A1 | 9/2002 | Antonin et al. | |
| 2002/0161895 A1 | 10/2002 | Appiah et al. | |
| 2002/0178271 A1 | 11/2002 | Graham et al. | |
| 2003/0023963 A1 | 1/2003 | Birkholz et al. | |
| 2003/0069951 A1 | 4/2003 | Fong et al. | |
| 2003/0172145 A1 | 9/2003 | Nguyen | |
| 2003/0200288 A1 | 10/2003 | Thiyagarajan et al. | |
| 2003/0212762 A1 | 11/2003 | Barnes et al. | |
| 2004/0003139 A1 | 1/2004 | Cottrille et al. | |
| 2004/0083479 A1 | 4/2004 | Bondarenko et al. | |
| 2004/0088141 A1 | 5/2004 | Ashley | |
| 2005/0038888 A1 | 2/2005 | Labertz | |
| 2005/0144528 A1 | 6/2005 | Bucher et al. | |
| 2006/0021017 A1 | 1/2006 | Hinton et al. | |
| 2006/0031394 A1 | 2/2006 | Tazuma | |
| 2006/0041488 A1 | 2/2006 | O'Reirdon et al. | |
| 2006/0112188 A1 | 5/2006 | Albanese et al. | |
| 2006/0218488 A1 | 9/2006 | Shah et al. | |
| 2006/0294372 A1 | 12/2006 | Maxa et al. | |
| 2007/0044086 A1 | 2/2007 | Sampath | |
| 2007/0083917 A1 | 4/2007 | Peterson et al. | |
| 2007/0088707 A1 | 4/2007 | Durgin et al. | |
| 2007/0165541 A1 | 7/2007 | Arpee | |
| 2007/0174106 A1* | 7/2007 | Aniszczyk | G06Q 30/00 717/125 |
| 2007/0198797 A1 | 8/2007 | Kavuri et al. | |
| 2007/0208746 A1 | 9/2007 | Koide et al. | |
| 2007/0239730 A1 | 10/2007 | Vigelette et al. | |
| 2007/0240160 A1 | 10/2007 | Paterson-Jones et al. | |
| 2007/0250829 A1 | 10/2007 | Hillier et al. | |
| 2007/0268506 A1 | 11/2007 | Zeldin | |
| 2007/0268516 A1 | 11/2007 | Bugwadia et al. | |
| 2008/0021732 A1 | 1/2008 | Richards et al. | |
| 2008/0033921 A1 | 2/2008 | Arrouye et al. | |
| 2008/0065700 A1 | 3/2008 | Lim | |
| 2008/0071728 A1 | 3/2008 | Lim | |
| 2008/0080526 A1 | 4/2008 | Gounares et al. | |
| 2008/0086318 A1 | 4/2008 | Gilley et al. | |
| 2008/0130639 A1 | 6/2008 | Costa-Requena et al. | |
| 2008/0133964 A1 | 6/2008 | Rogers et al. | |
| 2008/0154957 A1 | 6/2008 | Taylor et al. | |
| 2008/0215404 A1* | 9/2008 | Diao | G06Q 30/02 707/999.107 |
| 2008/0229381 A1 | 9/2008 | Sikka et al. | |
| 2008/0235180 A1 | 9/2008 | Anand et al. | |
| 2008/0255895 A1 | 10/2008 | Rajamony et al. | |
| 2009/0007143 A1 | 1/2009 | Chang et al. | |
| 2009/0013312 A1 | 1/2009 | Albert et al. | |
| 2009/0217306 A1 | 8/2009 | Wusthoff et al. | |
| 2009/0249284 A1 | 10/2009 | Antosz et al. | |
| 2009/0276667 A1 | 11/2009 | Dopson et al. | |
| 2009/0276771 A1 | 11/2009 | Nickolov et al. | |
| 2009/0300151 A1 | 12/2009 | Friedman et al. | |
| 2010/0070319 A1 | 3/2010 | Prafullchandra et al. | |
| 2010/0082378 A1* | 4/2010 | Isaacs | G06Q 10/06393 705/7.11 |
| 2010/0106767 A1 | 4/2010 | Livshits et al. | |
| 2010/0138639 A1 | 6/2010 | Shah et al. | |
| 2010/0146085 A1 | 6/2010 | Van Wie et al. | |
| 2010/0146148 A1 | 6/2010 | Schwimer et al. | |
| 2010/0210975 A1 | 8/2010 | Anthony, III et al. | |
| 2010/0250748 A1 | 9/2010 | Sivasubramanian et al. | |
| 2010/0312979 A1 | 12/2010 | Kavuri et al. | |
| 2011/0010222 A1 | 1/2011 | Choudhary et al. | |
| 2011/0010518 A1 | 1/2011 | Kavuri et al. | |
| 2011/0078293 A1 | 3/2011 | Phung et al. | |
| 2011/0131315 A1 | 6/2011 | Ferris et al. | |
| 2011/0138174 A1 | 6/2011 | Aciicmez et al. | |
| 2011/0295925 A1 | 12/2011 | Lieblich et al. | |
| 2011/0296025 A1 | 12/2011 | Lieblich et al. | |
| 2011/0320395 A1 | 12/2011 | Dada et al. | |
| 2012/0084262 A1 | 4/2012 | Dwarampudi et al. | |
| 2012/0131173 A1 | 5/2012 | Ferris et al. | |
| 2012/0137112 A1 | 5/2012 | Bolen et al. | |
| 2012/0137304 A1 | 5/2012 | Boullery et al. | |
| 2012/0180044 A1 | 7/2012 | Donnellan et al. | |
| 2012/0297307 A1 | 11/2012 | Rider et al. | |
| 2013/0007845 A1 | 1/2013 | Chang et al. | |
| 2013/0042123 A1 | 2/2013 | Smith et al. | |
| 2013/0139126 A1 | 5/2013 | Archer et al. | |
| 2013/0159202 A1 | 6/2013 | Darden, II et al. | |
| 2013/0205007 A1 | 8/2013 | Ayachitula et al. | |
| 2013/0232245 A1 | 9/2013 | Antosz et al. | |
| 2013/0263088 A1 | 10/2013 | Hoff et al. | |
| 2013/0332588 A1 | 12/2013 | Maytal et al. | |
| 2014/0006858 A1 | 1/2014 | Helfman et al. | |
| 2014/0019212 A1 | 1/2014 | Lieblich et al. | |

OTHER PUBLICATIONS

Ferreira, N. A. C. (2012). From information systems requirements to service-oriented logical architectures (Year: 2012).*

Kersten, K. (1998). The management of networks with specific reference to security management (Year: 1998).*

Amer, W. (2006). Distributed embedded system with internet GSM connectivity for intelligent e-monitoring of machine tools (Year: 2006).*

Buskey, C. D. (2005). A software metrics based approach to enterprise software beta testing design (Year: 2005).*

1. Violino, B. (2005). IT frameworks demystified; ITIL, COBIT, CMMi, ISO 17799—best practices abound for managing the new data center. Network World (Year: 2005).*

"Stream", Dictionary.com, Available Online at: http://www.dictionary.com/browse/stream, Accessed from Internet on Apr. 3, 2017, 2 pages.

U.S. Appl. No. 13/478,777 , "Non-Final Office Action", dated Oct. 15, 2013, 8 pages.

U.S. Appl. No. 13/478,777 , "U.S. Patent Application", Titled "Best Practice Analysis, Third-Party Plug-Ins", May 23, 2012.

U.S. Appl. No. 13/478,872 , "Best Practice Analysis, Optimized Resource Use", May 23, 2012.

U.S. Appl. No. 13/478,872 , "Final Office Action", dated Dec. 17, 2015, 12 pages.

U.S. Appl. No. 13/478,872 , "Non-Final Office Action", dated Jun. 24, 2015, 13 pages.

U.S. Appl. No. 13/478,872 , "Non-Final Office Action", dated Jul. 28, 2016, 19 pages.

U.S. Appl. No. 13/478,872 , "Notice of Allowance", dated Dec. 21, 2016, 10 pages.

U.S. Appl. No. 13/478,920 , "Best Practice Analysis Automatic Remediation", May 23, 2012.

U.S. Appl. No. 13/478,920 , "Non-Final Office Action", dated Mar. 19, 2015, 15 pages.

U.S. Appl. No. 13/478,920 , "Notice of Allowance", dated Aug. 26, 2015, 8 pages.

U.S. Appl. No. 13/478,960 , "Best Practice Analysis, Migration Advisor", May 23, 2012.

U.S. Appl. No. 13/478,960 , "Non-Final Office Action", dated Feb. 21, 2014, 7 pages.

(56) References Cited

OTHER PUBLICATIONS

U.S. Appl. No. 13/478,960 , "Notice of Allowance", dated Oct. 7, 2014, 8 pages.
U.S. Appl. No. 13/479,146 , "Best Practice Analysis as a Service", May 23, 2012.
U.S. Appl. No. 13/479,146 , "Final Office Acion", dated Jul. 15, 2015, 21 pages.
U.S. Appl. No. 13/479,146 , "Final Office Action", dated Apr. 7, 2017, 49 pages.
U.S. Appl. No. 13/479,146 , "Non-Final Office Action", dated Dec. 23, 2014, 15 pages.
U.S. Appl. No. 13/479,146 , "Non-Final Office Action", dated Jan. 2, 2020, 25 pages.
U.S. Appl. No. 13/479,146 , "Non-Final Office Action", dated Sep. 9, 2016, 33 pages.
U.S. Appl. No. 13/479,146 , "Notice of Allowance", dated Apr. 8, 2020, 13 pages.
U.S. Appl. No. 14/617,880 , "Best Practice Analysis, Migration Advisor", U.S. Patent Application, Feb. 9, 2015.
U.S. Appl. No. 14/617,880 , "Notice of Allowance", dated Aug. 3, 2015, 7 pages.
U.S. Appl. No. 14/937,341 , "Non-Final Office Action", dated Feb. 12, 2016, 6 pages.
U.S. Appl. No. 14/937,341 , "Notice of Allowance", dated Jun. 9, 2016, 9 pages.
U.S. Appl. No. 14/937,341 , "U.S. Patent Application No.", Best Practice Analysis, Migration Advisor, Nov. 10, 2015.
U.S. Appl. No. 15/489,647 , "Final Office Action", dated Jul. 9, 2019, 15 pages.
U.S. Appl. No. 15/489,647 , "Final Office Action", dated May 8, 2020, 16 pages.
U.S. Appl. No. 15/489,647 , "Non-Final Office Action", dated Mar. 28, 2019, 14 pages.
U.S. Appl. No. 15/489,647 , "Non-Final Office Action", dated Dec. 30, 2019, 18 pages.
Batschinski , "What is an api call?", quora.com, Sep. 8, 2016, 1 page.
Christ et al., "SanFrancisco performance: A case study in performance of largescale java applications", IBM Systems Journal, vol. 39, Issue 1, Jan. 2000, pp. 4-20.
Unknown , "Check Parameters for the System Configuration Checker", MSDN Datasheet. Microsoft Corporation, retrieved from http://msdn.microsoft.com/en-us/library/ms143753.aspx, 2012, 1 page.
Hassan et al., "Cost-Effective Resource Provisioning for Multimedia Cloud-Based E-Health Systems", Multimedia Tools and Applications, vol. 74, No. 14, 2015, pp. 5225-5241.

* cited by examiner

BEST PRACTICE ANALYSIS AS A SERVICE

CROSS REFERENCES TO RELATED APPLICATIONS

This application is a Divisional of U.S. Non-Provisional application Ser. No. 13/479,146, filed May 23, 2012, and entitled "BEST PRACTICE ANALYSIS AS A SERVICE", the content of which is herein incorporated by reference in its entirety. The present application is also related to application Ser. No. 13/478,920, filed on May 23, 2012 entitled "BEST PRACTICE ANALYSIS, AUTOMATIC REMEDIATION," application Ser. No. 13/478,777, filed on May 23, 2012 entitled "BEST PRACTICE ANALYSIS, THIRD-PARTY PLUG-INS," application Ser. No. 13/478,872, filed on May 23, 2012 "BEST PRACTICE ANALYSIS, OPTIMIZED RESOURCE USE," and application Ser. No. 13/478,960, filed on May 23, 2012 entitled "BEST PRACTICE ANALYSIS, MIGRATION ADVISOR," the entire contents of each is hereby incorporated by reference as if fully set forth herein, under 35 U.S.C. § 120.

BACKGROUND

Many data storage services, web services, and/or computing devices offer many different resource usage and/or allocation configurations. For example, a web service may be distributed, may be virtual, may provide different types of memory storage, and/or may provide various configuration options. In many conventional implementations, web service users may often store data in expensive, low-latency storage devices with capabilities that may exceed the needs of those accessing the data. Similarly, web service users may pay for options that they don't need or rarely use and/or they may not be aware of optimal configuration settings and/or resource allocation schemes or settings. As such, finding improved ways to allocate resources continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different FIG. indicates similar or identical items.

DETAILED DESCRIPTION

Figure 1:
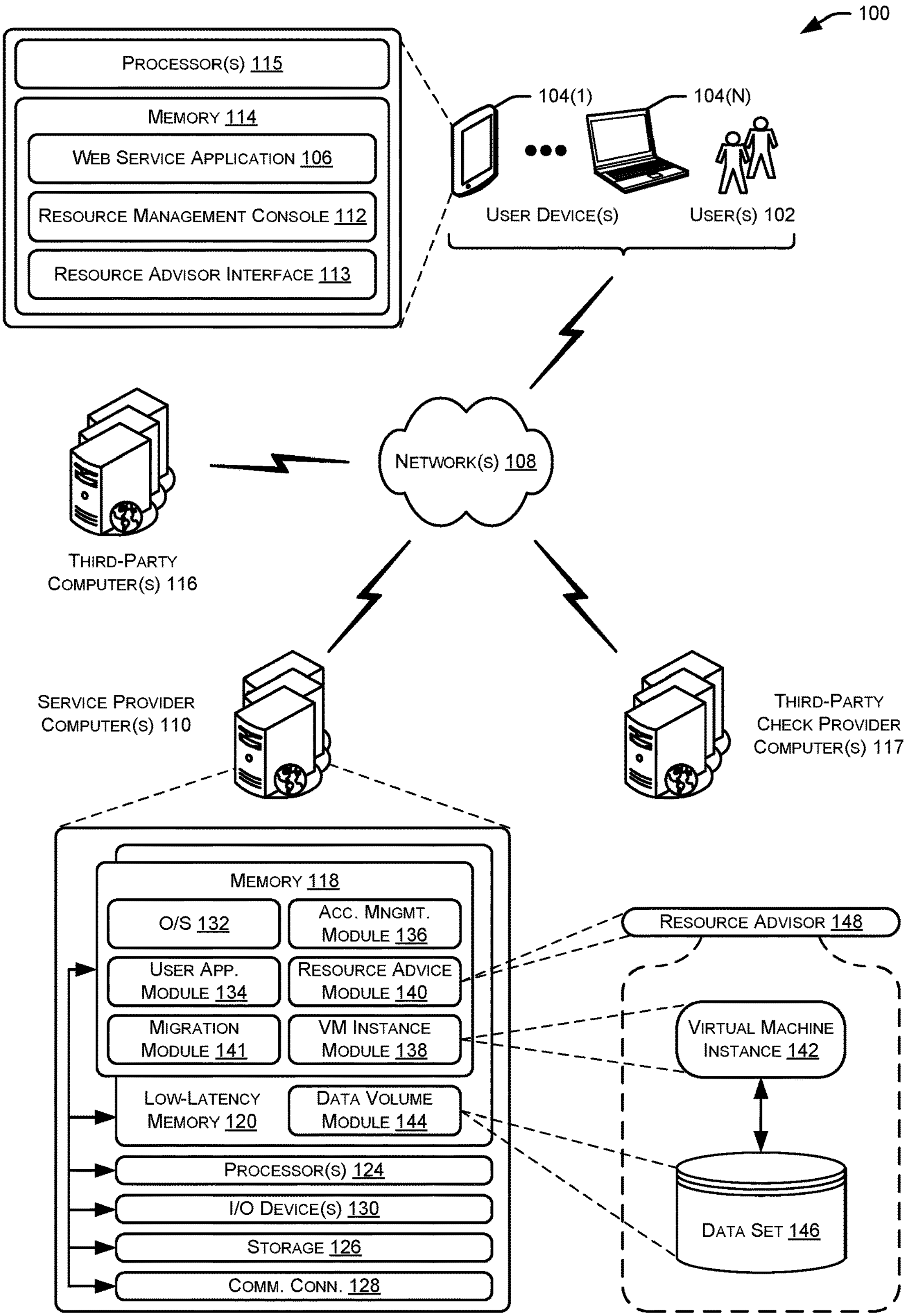
FIG. 1 illustrates an example architecture for implementing resource allocation advisement that includes a service provider computer, one or more user devices, and/or at least one other computing system connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing resource allocation advice regarding data storage, access, placement, and/or related web services to web service users via a computing resource and/or service provider. In some examples, the web service users may utilize or otherwise control a client entity of the service provider to control, access, or otherwise manage resources. As used herein, a client entity may include one or more virtual machine instances configured to access data of a distributed computing system (e.g., provided by the distributed system and acting on behalf of a client or user of the system). In some aspects, the service provider may provide storage, access, and/or placement of one or more computing resources through a service such as, but not limited to, a web service, a cloud computing service, or other network based data management service. For example, a user or client entity may access, via the service provider, data storage and/or management such that access mechanisms may be implemented and/or provided to the client entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired.

In some examples, the computing resources may be server computer systems in a distributed computing environment, although other computing resources are considered as being within the scope of the present disclosure, some examples of which are provided below. Additionally, in some examples, resource allocation advice for customers, accounts, and/or groups of accounts associated with one or more distributed systems may be determined based at least in part on one or more best practice checks, user settings, configurations, requests, triggers, and/or membership levels. For example, one or more best practice checks (or guidelines) associated with the distributed system may be generated over time based at least in part on historical information, customer comments, requests, or reviews, and/or known optimization techniques. As used herein, a best practice check may include one or more configuration or usage guidelines. That is, the check may merely be a setting or a configuration to be used to compare against a current setting. However, in some instances, the best practice check may include computer-executable instructions for receiving a current setting, comparing the setting against the guideline, and providing a response as to whether the current setting matches the guideline.

Additionally, in some aspects, a customer, user, and/or client may access a client entity of a distributed system for attaching data sets, data volumes, data blocks, or the like to the client entity for accessing, manipulating, and/or processing the data by the client entity. That is, a client entity may request that particular data volumes be operationally attached to the client entity. In some aspects, operationally attaching a data volume may include generating, storing, maintaining, and/or updating a mapping of data stored in the data volume such that the client entity may perform input and/or output (I/O) operations on the data. For example, data may be read from the attached data volume and/or written to the attached data volume by the client entity. According to some examples, data volumes that are attached may be stored in a relatively low latency type of memory such that the I/O operations performed on the data may be performed in a faster (i.e., lower latency) fashion.

Data volumes that are attached to client instances (i.e., client entities or virtual machine instances), in some examples, may be stored in one or more primary memory spaces (e.g., low latency memory) or in one or more backup memory spaces (e.g., high latency memory, durable memory, and/or other low latency memory). In some cases, the attached data volumes may be stored in both primary memory spaces and backup memory spaces. In this way, one or more layers of redundancy may help protect from data loss or corruption. Additionally, in some aspects, a user or client entity may request to detach a data volume when, for example, the user or client entity may not plan to access or otherwise perform I/O operations on the data volume for a foreseeable amount of time. For example, a data volume may include resources for operating a seasonal website or other service that operates periodically. Alternatively, or in addition, the data volume may include resources for application development that may be complete or otherwise no longer needed. As such, it may not be desirable to maintain attachment to the client entity at all times. Further, in some examples, a client instance may be taken down, removed, or otherwise deactivated such that it is no longer operational. In this case, attached data volumes may be detached as a matter of course. However, in some examples, although a data volume may be detached for one or more particular reasons, the data volume may continue to be stored in the low latency memory space and/or the backup memory space.

Additionally, utilizing the best practice checks noted above, and based at least in part on the above noted settings, triggers, etc., the distributed system may determine and/or provide one or more configuration settings and/or resource allocation recommendations to a customer and/or account holder. For example, configuration settings may include a number or type of virtual machine instances to use, a number or type of data storage devices to use, a type of security to use, a frequency of data backups, which network ports to utilize, etc. Additionally, in some aspects, best practice checks may include, but are not limited to, identifying health issues, security issues, and/or cost optimization issues associated with any resources of the distributed environment such as those associated with client instances, stored data, network connections, etc. Upon performance of the best practice check, the configuration setting and/or resource allocation recommendation provided may indicate one or more remedies for resolving the issue and/or fixing the account settings to comply with the best practice guidelines.

In some aspects, the distributed system, a service provided by the distributed system, or a service provided by a third-party may automatically perform one or more of a set (or other non-limiting grouping) of best practice checks on an account of a customer and/or user or on a group of accounts (federated or not). The service may perform the checks based on an account level of the user. For example, at a low or basic level, the service may perform a limited number of checks. When the user or account is associated with a higher account level, the service may perform more checks on the account than for an account in the basic level. Additionally, a sliding scale of levels may be used to discern between different accounts, potentially providing multiple different amounts and/or types of checks to be performed on different accounts. Further, in some examples, the service may perform all or a substantially large percentage of checks on accounts within a premium level. In some instances, user and/or customer may register for different levels, levels may be assigned based on seniority or amount of time using the service, and/or users and/or customers may pay different amounts to be in certain levels. For example, the premium level may cost the most, while the basic level may cost the least.

Additionally, in some aspects, the service provider may perform the one or more best practice checks based on user and/or customer settings. For example, a user setting may indicate that the service provider should always perform, never perform, and/or intermittently perform certain checks. In addition, some settings may instruct the service provider to perform certain checks only in certain instances or only after certain triggers such as, but not limited to, an amount of time since performance of the last check, an amount of time since the last data read or write, a threshold amount of data being stored, accessed, or managed by the user is reached, combinations of the foregoing, or the like. Similarly, any and/or all other customer customization of best practice checks may be configured as desired.

The service provider may also be configured to determine resource allocation advice, in some examples, based at least in part on the best practice checks, particular account settings, and/or usage information. A remediation plan may also be determined. For example, if it is determined that data has not been backed up recently enough (e.g., outside of the determined best practice check metrics), the remediation plan may include a recommendation and/or an instruction to back up the data. In some aspects, the service provider may be configured to perform the remediation plan automatically. Additionally, automatic remediation may be configured by the user such that only certain remediation operations are performed automatically. In this case, remediation plans that are not performed automatically may still be indicated. That is, the service provider may transmit or otherwise notify the user of the remediation plan and/or an instruction for performing the remediation plan without automatically performing the remediation. Remediation plans may also include one-click remediation to fix determined issues, third-party remediation options, and/or information regarding how to consult a remediation advisor for additional help. Additionally, in some aspects, the best practice checks and/or remediation actions (and/or recommendations) may be performed or otherwise provided by third-party services. Further, in some aspects, users and/or customers may be charged a commission based at least in part on the savings or performance increase generated from the best practice checks and/or the remediation actions.

In some examples, the service provider may receive best practice checks from third-party service providers (or third-party check providers). In this way, the service provider may act as a third-party check marketplace where users may view, review, select, and/or purchase one or more best practice checks to be performed on accounts. In some examples, the best practice marketplace may include only third-party checks, only service provider determined (or provided) checks, or a combination of the two. The user may owe a commission to the service provider based at least in part on the number of checks selected and/or performed, the number of selected checks that are third-party provided, and/or an amount of cost or resources saved by utilizing the checks. Further, in some cases, the checks (including the third-party checks) could be configured to identifying performance, health, security, etc., issues of other service providers (e.g., other than the service provider performing the checks), applications, and/or other computing device (e.g., non-services).

Additionally, in some aspects, the service provider may be configured to automatically perform checks to identify ways in which a user could save (or could have saved) money and/or better utilized selected resources. For example, by utilizing reserved instances, a customer may sometimes reduce the cost of using virtual machine instances. However, sometimes, customers fail to appropriately use reserve instances, thus spending more money than is necessary to carry out their objectives when using a web service. As used herein, a reserved instance may include a virtual machine instance hour that can be reserved by a customer at a discounted rate. By reserving the time and/or the instance, the customer is guaranteeing to pay for the time, whether the instance is used or not. However, in return, the customer is charged less. Thus, in some examples, the service provider may utilize the best practice checks to monitor a customer's use of on-demand instances (e.g., non-reserved instances that are purchased when they are needed), and indicate whether the customer could have saved money by using a reserved instance instead. Further, in some examples, the service provider may predict or otherwise estimate (or utilize third-party estimation/prediction tools) instance usage of a customer, and utilize this estimation to determine appropriate and/or recommended resource allocation settings.

Further, in some examples, the service provider may determine one or more migration options for migrating a user account from a first web service (or other service) to a second web service (or comparable service). That is, the best practice checks and/or information associated with usage of the first service may be utilized to determine appropriate settings for utilizing the second service to operate the account (for at least similar or the same functionality). Best practice architecture information may be provided to the user and/or instructions for how to migrate the user account to the service provider's system. Additionally, in some aspects, the service provider may include costs savings and/or performance enhancements that may be realized by the customer upon migration. Further, the service provider may provide automatic migration, based at least in part upon a request from the customer, from the first service to the second service.

More specifically, a service provider computer, such as a server operated by a financial institution, an online merchant, a news publication company, a web services company, a social networking company, or the like, may maintain and/or backup data volumes for one or more client entities of a distributed computing system. The service provider computer may also receive requests to backup data volumes associated with the client entities, to attach and/or detach data volumes to the client entities, and/or to utilize other resources and/or services of the service provider. Additionally, in some examples, the service provider may receive, determine, and/or otherwise collect statistical information associated with the resource (e.g., client entities, data volumes) and/or services in order to perform the best practice checks. For example, a user or a client entity (e.g., operating on behalf of a user) may request to utilize a load balancer for managing read and/or write requests from customers of the user. In this example, and based at least in part on user settings and/or predetermined thresholds, the service provider may perform one or more load balancing checks on the account of the user. For example, a check may identify whether the load balancer is utilizing only one zone or physical area (e.g., a location of the servers being used to process the data) and/or whether the load balancer has an imbalanced distribution. In some cases, this best practice check may be used to help avoid a single point of failure. Based at least in part on the outcome of this best practice check, resource allocation advice may be provided to the user, automatic remediation may be performed, and/or one or more settings (e.g., for manual remediation) may be provided to the user.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for resource allocation advisement may be implemented. In architecture 100, one or more customers and/or users 102 (i.e., account holders) may utilize user computing devices 104(1)-(N) (collectively, user devices 104) to access a web service application 106, or a user account accessible through the web service application 106, via one or more networks 108. In some aspects, the web service application 106 and/or user account may be hosted, managed, and/or provided by a computing resources service or service provider, such as by utilizing one or more service provider computers 110. In some examples, a customer may own, manage, operate, control, or otherwise be responsible (e.g., financially) for one or more accounts, groups of accounts, and/or sub-groups of accounts. The one or more service provider computers 110 may, in some examples, provide computing resources such as, but not limited, client entities, low latency data storage, durable data storage, data access, management, virtualization, etc. In some aspects, a client entity may be virtual and/or data volumes may be stored virtually within a distributed computing system operated by the one or more service provider computers 110. The one or more service provider computers 110 may also be operable to provide web hosting, computer application development and/or implementation platforms, combinations of the foregoing, or the like to the one or more users 102.

In some examples, the networks 108 may include any one or a combination of many different types of networks, such as cable networks, the Internet, wireless networks, cellular networks, and other private and/or public networks. While the illustrated example represents the users 102 accessing the web service application 106 over the networks 108, the described techniques may equally apply in instances where the users 102 interact with a service provider computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web service application 106 may allow the users 102 to interact with a service provider computer 110, such as to store, access, and/or manage data, develop and/or deploy computer applications, and/or host web content. The one or more service provider computers 110, perhaps arranged in a cluster of servers or as a server farm, may host the web service application 106. Other server architectures may also be used to host the web service application 106. The web service application 106 may be capable of handling requests from many users 102 and serving, in response, various user interfaces that can be rendered at the user devices 104 such as, but not limited to the resource management console 112 and/or the resource advisor interface 113. The web service application 106 can be any type of website that supports user interaction, including social networking sites, online retailers, informational sites, blog sites, search engine sites, news and entertainment sites, and so forth. As discussed above, the described techniques can similarly be implemented outside of the web service application 106, such as with other applications running on the user devices 104.

As noted above, the architecture 100 may include one or more user devices 104. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 110 via the networks 108, or via other network connections.

In one illustrative configuration, the user devices 104 may include at least one memory 114 and one or more processing units (or processor(s)) 115. The processor(s) 115 may be implemented as appropriate in hardware, computer-executable instructions, firmware, or combinations thereof. Computer-executable instruction or firmware implementations of the processor(s) 115 may include computer-executable or machine-executable instructions written in any suitable programming language to perform the various functions described.

The memory 114 may store program instructions that are loadable and executable on the processor(s) 115, as well as data generated during the execution of these programs. Depending on the configuration and type of user device 104, the memory 114 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

Turning to the contents of the memory 114 in more detail, the memory 114 may include an operating system and one or more application programs or services for implementing the features disclosed herein including at least the resource management console 112 or the resource advisor interface 113, such as web browsers or dedicated applications (e.g., smart phone applications, tablet applications, etc.), and/or the web service application 106. The resource management console 112 may be configured to receive, store, and/or display a website or other interface for interacting with the service provider computers 110. All, part, or none of the resource advisor interface 113 may be viewable and/or integrated within the resource management console 113. Additionally, the memory 114 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 102 provided response to a security question or a geographic location obtained by the user device 104.

Additionally, in some aspects, the resource management console 112 may allow a user 102 to interact with a web services account of the service provider computers 110. For example, the user 102 may request that computing resources be allocated to instantiate a client entity on behalf of the user 102. Further, the client instance may then be physically or virtually attached to one or more data stores via interaction between the user 102 and the resource management console 112. Also utilizing the resource management console 112, in some examples, a user 102 may request that snapshots (e.g., backup copies—described in further detail below) of attached data sets be stored in additional memory spaces. For example, a snapshot request may involve backing up one or more portions of data volumes or entire data volumes on behalf of the user 102. In some aspects, however, a snapshot may involve only storing a backup of data that has changed within a data set since the last snapshot, backup, or creation of the data set. For example, if a first snapshot is taken that generates a backup of an entire data volume, a second snapshot (requested after only a few bytes of the volume have changed) may only back-up the particular few bytes of the volume that have changed. The resource management console 112 may also be configured to receive, organize, store, and/or manage account settings and/or preferences. For example, configuration settings associated with how many instances to utilize, what network ports to open, whether to purchase reserved instances, locations and/or zones in which data should be stored, user-preferred security settings, etc., may be received from, stored on behalf of, and/or managed on behalf of the user and/or account via the resource management console 112.

Further, in some aspects, the resource advisor interface 113 may be configured to receive requests from the users 102 to optimize configurations and/or resource usage of the resources provided by the service provider computer 110. For example, utilizing the resource management module 112, a user 102 may configure a web services account of the service provider computers 110 to instantiate a virtual client entity and further attach data volumes for consumption by the virtual client instance. The user may then, in some examples, utilize the resource advisor interface 113 to request that the configuration of the client instance and/or attached data volume be optimized or otherwise configured to be more efficient, cost-effective, secure, etc. The users 102 may also utilize the resource advisor interface 113 to request resource usage optimization of the virtual resources, resource usage and/or configuration optimization of other computing devices, such as third-party computers 116, and/or resource usage and/or configuration optimization of one or more other services or devices, including the user devices 104.

In some examples, optimization of an account, a group of accounts (e.g., one or more accounts linked financially or otherwise associated with one another), or for a particular customer, group of customers, business entity, group of business entities, etc., may include saving money for the entity (i.e., account, customer, business, etc.), improving security for the entity, improving efficiency for the entity, and/or improving durability of data for the entity. As used herein, resource usage information may include, but is not limited to, how (i.e., in which way), when (i.e., during what dates, times, and/or time intervals), and/or where (i.e., in which geographic locations and/or which servers, computers, etc.) the resources of the distributed system are being utilized by a customer and/or account. Additionally, as used herein, resource usage optimization may include, but is not limited to, optimizing how resources are used based on usage data and/or configuration information. That is, best practice decisions (i.e., optimization recommendations) may be made based at least in part on how resources (e.g., virtual machine instances, data storage devices, etc.) are utilized (or configured to be utilized) to determine how resources should be utilized (e.g., how often, when, from where, etc.). Alternatively, or in addition, configuration optimization may include, but is not limited to, determining appropriate or best practice configuration settings based on configuration information and/or usage information.

Further, in some examples, the resource advisor interface 113 may display or otherwise provide resource advice provided by the service provider computers 110 for optimizing the user devices 104, the resources controlled by the service provider 110 (or other service provider) on behalf of the user 102, some other service, and/or some other devices or applications, such as the third party computers 116 or an application running on any one of the above mentioned computing devices. The resource advisor interface 113 may also act as a migration interface, when the service provider computers 110 are used as a migration advisor. That is, in some examples, the service provider computers 110 may provide migration advice and/or services associated with migrating services from one or more web services to one or more other web services, such as but not limited to migrating services from the third-party computers 116 to the service provider computers 110 or vice versa. Additionally, in some examples, the resource advisor interface 113 may be configured to provide third-party checks for selection by the users 102 of the system. That is, one or more third-party check provider computers 117 may provide third-party performance checks to the service provider via the one or more networks 118. These third-part checks may be provided (e.g., in the form of a third-party performance check marketplace) for use by the users 102. Upon selection of a third-party check, the service provider computers 110 may utilize the third-party check to optimize the resources of the service provider computers 110, of other services, and/or of other devices.

In some aspects, the service provider computers 110 may also be any type of computing devices such as, but not limited to, mobile, desktop, thin-client, and/or cloud computing devices, such as servers. In some examples, the service provider computers 110 may be in communication with the user devices 104, the third-party computers 116, and/or the third-party check provider computers 117 via the networks 108, or via other network connections. The service provider computers 110 may include one or more servers, perhaps arranged in a cluster, as a server farm, or as individual servers not associated with one another. These servers may be configured to host a website (or combination of websites) viewable via the user devices 104 or a web browser accessible by a user 102. Additionally, in some aspects, the service provider computers 110 may be configured to perform resource allocation advisement as part of an integrated, distributed computing environment.

In one illustrative configuration, the service provider computers 110 may include at least one memory 118, at least one low-latency memory 120, and one or more processing units (or processor(s)) 124. The processor(s) 124 may be implemented as appropriate in hardware, computer-executable instructions, firmware, or combinations thereof. Computer-executable instruction or firmware implementations of the processor(s) 124 may include computer-executable or machine-executable instructions written in any suitable programming language to perform the various functions described.

The memory 118 may store program instructions that are loadable and executable on the processor(s) 124, as well as data generated during the execution of these programs. Depending on the configuration and type of service provider computers 110, the memory 118 may be volatile (such as random access memory (RAM)) and/or non-volatile (such as read-only memory (ROM), flash memory, etc.). The service provider computers 110 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 118 may include multiple different types of memory, such as static random access memory (SRAM), dynamic random access memory (DRAM), or ROM.

The memory 118, the additional storage 126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 118 and the additional storage 126 are all examples of computer storage media.

The service provider computers 110 may also contain communications connection(s) 128 that allow the service provider computers 110 to communicate with a stored database, another computing device or server, user terminals, and/or other devices on the networks 108. The service provider computers 110 may also include input/output (I/O) device(s) 130, such as a keyboard, a mouse, a pen, a voice input device, a touch input device, a display, speakers, a printer, etc.

Turning to the contents of the memory 118 in more detail, the memory 118 may include an operating system 132 and one or more application programs or services for implementing the features disclosed herein including a user application module 134, an account management module 136, a virtual machine instance module 138, a resource advice module 140, and/or a migration module 141. The user application module 134 may be configured to generate, host, or otherwise provide the resource management console 112, and/or a website for accessing the resource management console 112 (e.g., the web service application 106), to users 102.

In some examples, the account management module 136 may be configured to maintain, or otherwise store, account information associated with requested resources, data, and/or services. The account information may include account holder information, the user ID, the password, acceptable answers to challenge questions, etc. In some aspects, the virtual machine instance module 138 may be configured to operate as a hypervisor or other virtualization system. For example, the virtual machine instance module 138 may create, generate, instantiate, or otherwise provide one or more virtual machine instances 142 (i.e., a client entity of the distributed system) to a user 102 by providing one or more guest operating systems that may operate on behalf of the user 102. That is, in some examples, a user 102 may operate a virtual machine instance 142 as if the operations were being performed by one or more processors 114 of a user device 104. As such, the virtual machine instance 142 may be considered a client entity acting on behalf of user 102 and/or accessing data, data sets, data volumes, data blocks, etc., of the one or more service provider computers 110.

Additionally, in some examples, the one or more service provider computers 110 may include a low-latency memory 120. The low-latency memory 120 may include one or more application programs or services for implementing the features disclosed herein including a data volume module 144. In some examples, as shown in FIG. 1, the data volume module 144 may be configured to implement, host, or otherwise manage data stored in a data set 146. As noted above, in some aspects, a user 102 may make requests for attaching and/or detaching data sets 146 from one or more virtual machine instances 142 (i.e., client entities) and/or for backing up (e.g., taking a snapshot of) data of the attached data volumes. For example, a user may be an application programmer testing code using a virtual machine instance 142 and an attached data set 146 of the service provider computers 110. In this non-limiting example, while the code is being tested, the user 102 may have the data set 146 attached to the virtual machine instance 142 and may request that one or more I/O operations be performed on the attached data set 146. During and/or after testing of the code, the user 102 may make one or more backup (e.g., snapshot) requests of the attached data set 146. However, in some examples, once the testing is complete, the user 102 may request that the attached data set 146 be detached from the virtual machine instance 142. Further, other operations and/or configurations utilizing the virtual machine instance 142 and/or the data set 146 may be envisioned, as desired, for implementing a web service on behalf of a user 102.

Returning to the contents of the memory 118 in more detail, the service provider computers 110 may execute a resource advice module 140 and/or a migration module 141. In some examples, the resource advice module 140 and/or the migration module 141 may be configured to generate, host, or otherwise provide the resource advisor interface 113, and/or a website for accessing the resource advisor interface 113 (e.g., the web service application 106), to users 102. In some aspects, the resource advice module 140 may be configured to host or otherwise provide a resource advisor 148 for generating and/or providing resource allocation advice and/or instructions to a customer and/or user 102. In some examples, the resource advisor 148 may be configured to monitor, collect, or otherwise receive, information associated with one or more resources of a computing service or device. Further, the resource advisor 148 may be configured to aggregate resource information associated with one or more related or unrelated accounts. In one non-limiting instance (e.g., as shown in FIG. 1), the resource advisor 148 may receive API calls placed by the virtual machine instance 148 or may scrape the data set 146 for data usage information. In other examples, the resource advisor 148 may receive API calls placed by other entities on other resources and/or may determine configuration information associated with the resources by querying one or more configuration files of the service provider computers 110 that are associated with the one or more users 102 and/or accounts of users 102.

The resource advice module 140 may also generate best practice guidelines and/or resource allocation checks for determining appropriate resource allocation and/or configuration recommendations. Additionally, in some examples, the resource advice module 140 may receive guidelines and/or checks from third parties such as, but not limited to, third-party check provider computers 117. Based at least in part on the determined and/or received best practice checks as well as the collected resource allocation information (discussed above), the resource advice module 140 may also be configured to determine and/or perform one or more configuration and/or allocation recommendations and/or instructions. That is, in some examples, the resource advice module 140 may provide one or more resource allocation and/or configuration recommendations. However, in other examples, the resource advice module 140 may provide the recommendations, provide instructions for executing the recommendations, and/or perform (sometimes automatically or based at least in part on a customer provided setting) the recommended actions. Further, in some examples, the resource advisor 148 may be configured to provide aggregate recommendations and/or advise to a customer based at least in part on an analysis of one or more accounts associated with the customer. For example, a customer may have access to multiple different accounts and the resource advisor 148 may be able to provide recommendations for one of the accounts, all of the accounts combined, and/or varying subsets of all the accounts.

Best practice checks may, in some examples, fall into one or more of at least three categories including, but not limited to, health checks (i.e., based at least in part on a health determination associated with a resource), security checks (i.e., based at least in part on a security determination associated with a resource), and/or cost checks (i.e., based at least in part on a determination of how resources of the service are being used and/or costs associated with such use). Examples of health checks may include, without limitation, identifying data sets that have no backups or significantly aged backups (e.g., to reduce the risk of data loss), identifying load balancers that are only using one location or have imbalanced distribution (e.g., to eliminate a single point of failure), or determining if a customer is storing data or utilizing other resources in only a single location (e.g., to recommend utilizing multiple locations). Additional checks may include, without limitation, identifying virtual machine instances that have not been bundled (e.g., to prevent a loss of software stack configurations), identifying (and potentially alerting) when a customer's resources are located on the same host, rack, or location (e.g., to prevent stability risks), or identifying when a customer is using a database on an attached data volume (e.g., to recommend a database product for improved stability).

Additionally, examples of security checks may include, but are not limited to, identifying and/or verifying when a customer is utilizing an identity and access management (IAM) system, identifying flawed network access control list (ACL) configurations, identifying whether a customer is using one or more particular authorization techniques (e.g., multi-factor authorization), identifying spikes in billing and/or utilization that may signal a hijacked virtual machine instance, or identifying how many user privileges are granted through a customer's IAM service. Other security checks may also include, without limitation, identifying one or more security groups (e.g., if a load balancer is using a particular port—such as port 80 for example—to connect to a virtual instance, the resource advice module 140 may recommend not to open port 80 open for public access), identifying flawed bucket ACLs that may allow public users to read and/or write from devices being utilized by a customer, identifying if there any ports that a customer has left open on a virtual instance (e.g., to prevent the account from being compromised), or identifying databases that are not using appropriate security protocols (e.g., secure socket layer (SSL) techniques).

Additional security checks may include, but are not limited to, identifying when IAM users utilize security keys that are older than a predetermined threshold, identifying exploitable vulnerabilities in systems and web applications (e.g., based on on-demand penetration tests), identifying database (e.g., relational database) users whose passwords are older than a predefined threshold, identifying simple storage bucket policies, identifying virtual machine instances that are shared between multiple customers, identifying data backups that are shared, or identifying queue service policies which may allow inappropriate access to unknown parties.

Further, in some aspects, examples of cost checks may include, but are not limited to, identifying when accounts are approaching service limits (e.g., nearing some predefined instance limit such as, but not limited to, 90%), identifying idle instances (e.g., those with little to no processor utilization and/or data transfer), identifying infrequent or regular spikes in instance usage, identifying instance sizes that may reduce costs and/or improve performance (e.g., based at least in part on usage history), identifying opportunities for users to utilize spot instances (e.g., unused instances that users can bid on and then utilize), or identifying backups and/or data bundles which have no running instances associated therewith.

Additionally, some other cost checks may include, without limitation, evaluating customers usage distribution across locations or zones (e.g., to evaluate data transfer costs), identifying the use of reserved instances (RI) (e.g., to optimize (RI) usage, to identify when they are idle, to determine the applicability of offering discounts, etc.), identifying unused Internet Protocol (IP) addresses and/or unused elastic IP addresses (in some examples, an elastic IP address is one that can be dynamically remapped on the fly to point to any virtual instance) to reduce customer charges, identifying customers with multiple accounts (e.g., to recommend consolidation), identifying unnecessary API requests (e.g., by scanning API logs of customers), or identifying when customers are nearing their server SSL certificate max (e.g., based at least in part on a threshold below the max). Further examples of service cost may also include, but are not limited to, identifying content distribution (e.g., to recommend optimized strategies for same), identifying and/or modifying cost thresholds for customers (e.g., to alarm a customer upon reaching a predefined or user defined amount), identifying opportunities for customers to import and/or export data (e.g., to reduce transit costs), identifying storage types for certain data and/or systems (e.g., to optimize the storage based at least on comparisons between normal storage, reduced redundancy storage, or cold storage), identifying unnecessary charges for old data based at least in part on versioning information of the data, or identifying usage by product for particular resources (e.g., to provide the customer with a view of associated fees and usages).

The migration module 141, at least similar to the resource advice module 140 in some respects, may determine one or more configuration settings and/or resource allocation settings of for migration from a first web service to a target web service, based at least in part on the determined and/or received best practice checks. For example, a user 102 may be utilizing a web service of a first computing service. The migration module 141 may then (automatically or at the request of the user 102) determine, based at least in part on one or more of the best practice checks discussed above, appropriate settings of the target computing system. That is, the appropriate settings of the target computing system may be transmitted to the customer to indicate how their web service (currently running on the first computing system) would operate on the target system. In some examples, the migration module 141 may also determine and/or provide (e.g., to the customer) a cost estimate, time estimate, efficiency estimate, instructions for carrying out the migration, and/or other information associated with migrating the customer's service to the target system. Additionally, in some instances the migration may be from a first service to a target service, both operated by the same computing systems; or, alternatively, the migration may be to a target service operated by a computing system different from that operating the first service provider. Further, in some examples, the migration determinations may be determined based at least in part on one or more of the best practice checks discussed above. A few examples of the operations of the service provider computers are described in greater detail below with reference to FIGS. 6-21.

Additional types of computer storage media that may be present in the service provider computers 110 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 110. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
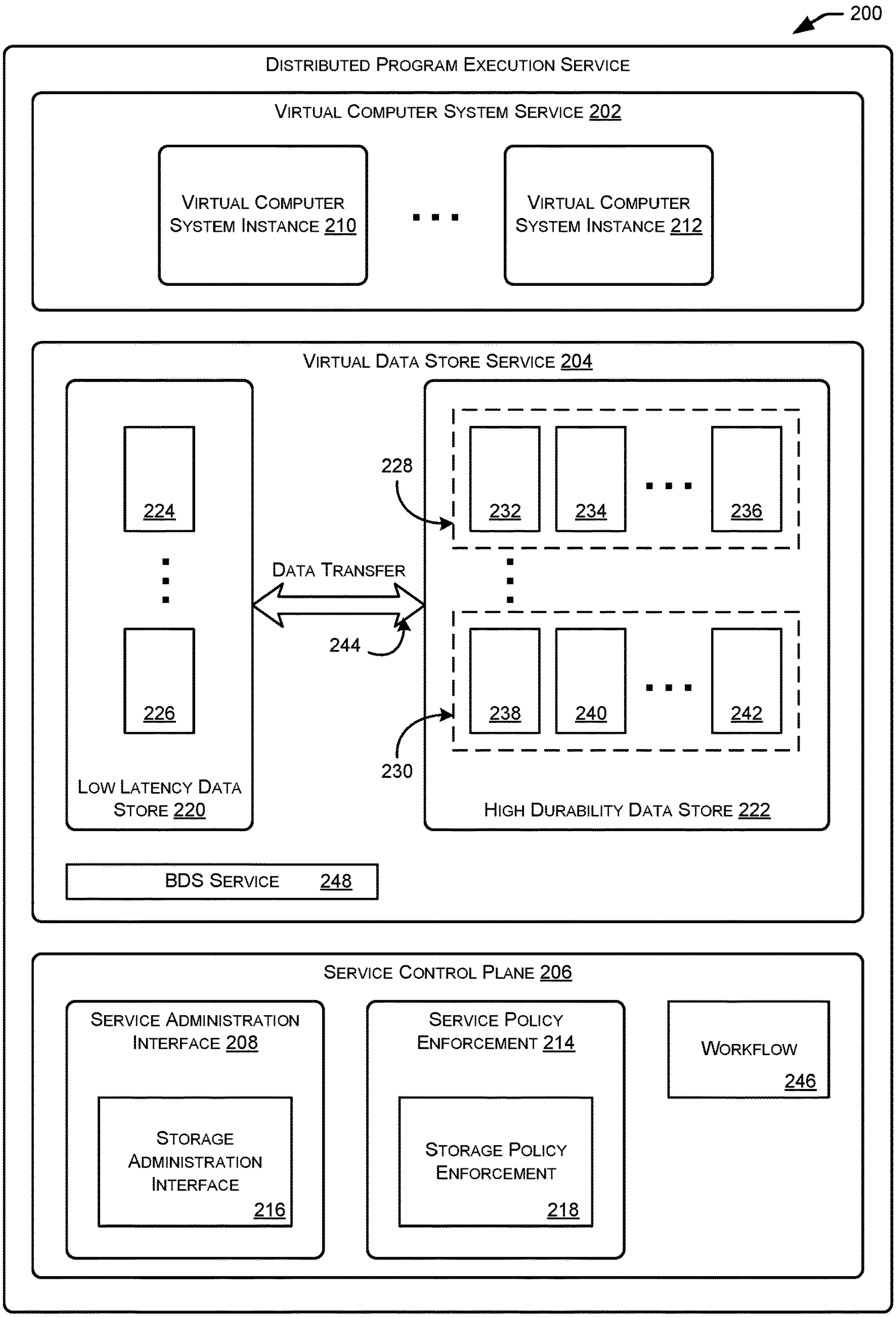
FIG. 2 illustrates an example architecture of a distributed program execution service that may be utilized to implement the resource allocation advisement described herein, according to at least one example.

As noted, in at least one example, one or more aspects of the environment or architecture 100 may incorporate and/or be incorporated into a distributed program execution service such as that hosted by the service provider computers 110. FIG. 2 depicts aspects of an example distributed program execution service 200 in accordance with at least one example. The distributed program execution service 200 may provide virtualized computing services, including a virtual computer system service 202 and a virtual data store service 204, with a wide variety of computing resources interlinked by a relatively high speed data network. Such computing resources may include processors such as central processing units (CPUs), volatile storage devices such as RAM, nonvolatile storage devices such as flash memory, hard drives and optical drives, servers such as the service provider computers 110 described above with reference to FIG. 1, one or more data stores such as the data set 146 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components, and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a web-based user interface configured at least to enable users and/or administrators of the virtualized computing services to provision, de-provision, configure, and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 (as well as with other ellipses throughout this disclosure) indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or web-based service interfaces. In at least one example, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data stores such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represent disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network (SAN) target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput, and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating, and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability, and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols, and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and/or annually. Different portions of the data set 224, 226 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). In a specific example, this may include taking a snapshot of the blocks that make up a virtual storage volume. Data transferred between the low latency data store 220 and high durability data store 222 may be orchestrated by one or more processes of the BDS service 248. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 222 along with an image of the virtual disk when it was sent to the physical computer.

The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental," for example, involving a copy of changes to the data set 224 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load. It should be noted that, while illustrative embodiments of the present disclosure discuss storage of captures in the high durability data store 222, captures may be stored in numerous ways. Captures may be stored in any data store capable of storing captures including, but not limited to, low-latency data stores and the same data stores that store the data being captured.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 3:
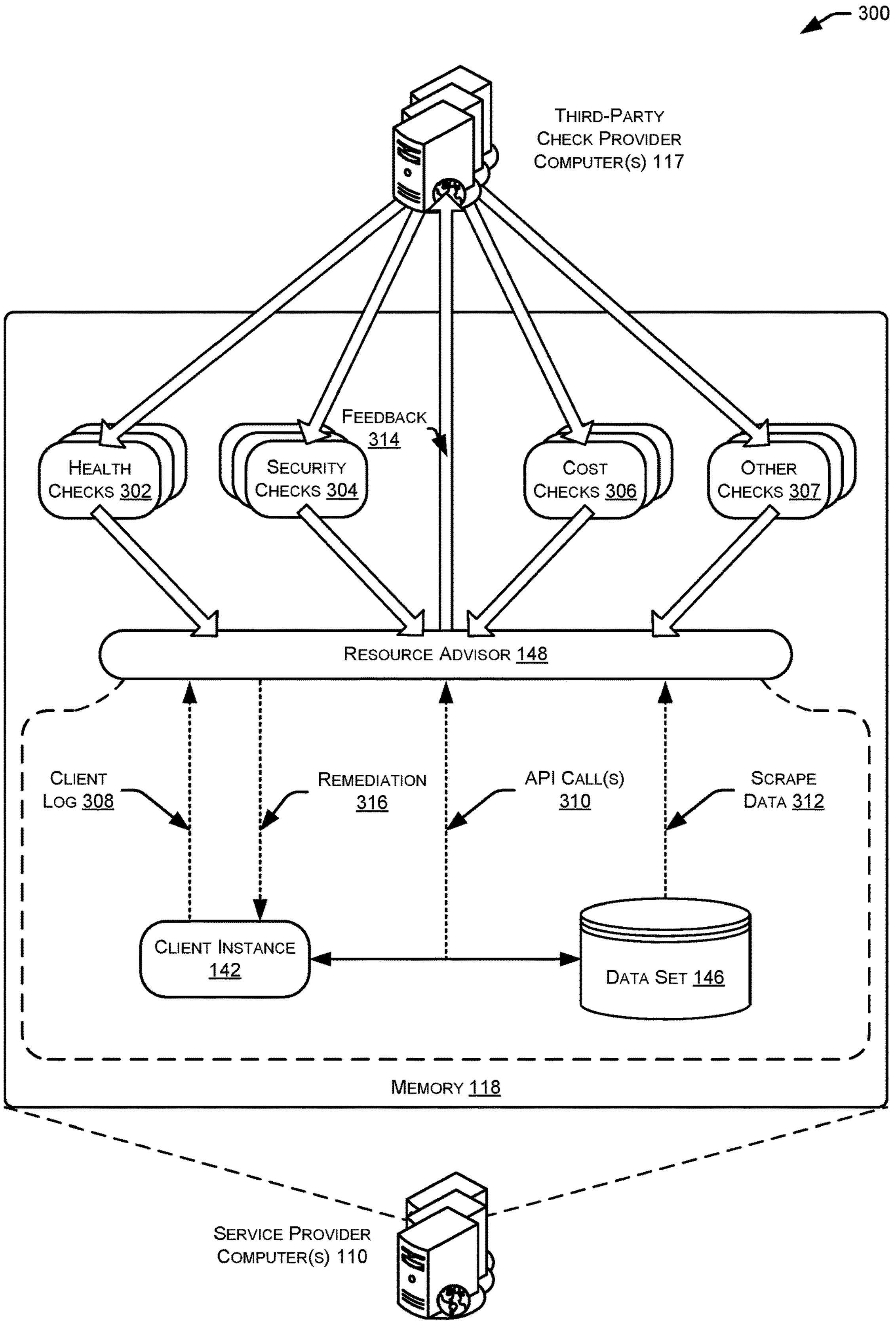
FIGS. 3 and 4 illustrate example block diagrams for describing at least some features of the resource allocation advisement described herein, according to at least one example.

FIG. 3 depicts an example block diagram 300 illustrating aspects and/or features of the example architecture 100 of FIG. 1 in which techniques for resource allocation advisement may be implemented. In the block diagram 300, aspects of the disclosure are shown again with reference to one or more distributed servers such as, but not limited to, the service provider computers 110 of FIG. 1. In some aspects a virtual machine instance 142 (hereinafter, "client instance 142") may be stored within the memory 118, or otherwise hosted (e.g., as described above with reference to virtual computer instances) by the service provider computers 110. Similarly, one or more data sets 146 may be stored within a data store or other memory 118 of the one or more service provider computers 110. In some aspects, the data set 146 may be attached (e.g., virtually attached) to the client instance 142. In this way, the client instance 142 may access the data set 146, performing read requests, write requests, gets, puts, other I/O operations, or the like. Further, as noted briefly above, the memory 118 may also store computer-executable instructions for implementing a resource advisor 148 for providing resource allocation advise, best practice recommendations, service and/or cost performance optimizations, etc., to one or more customers of a web service (e.g., hosted by the service provider computers 110). While not shown in FIG. 2, the resource advisor 148 may be configured to communicate with, or otherwise provide information or instructions to, a customer or account user of the web service.

As discussed above, in one non-limiting example, the resource advisor 148 may perform one or more best practice checks on a system and/or account associated with a user, such as the users 102 of FIG. 1. The best practice checks may include, but are not limited to, health checks 302, security checks 304, cost checks 306, and/or other checks 307. One or more of the one or more types of checks may be performed together, in sequence, simultaneously, recursively, repeatedly, etc., in order to determine resource allocation advice. That is, one or more health checks 302, one or more security checks 304, one or more cost checks 306, one or more other checks 307, or any combinations thereof may be performed on resources (e.g., the client instance 142, the data set 146, an account, a group of accounts, etc.) and/or configuration settings of a user 102. In some cases, the checks 302, 304, 306, 307 may be determined by the service provider computers 110 and may be stored in the memory 118 or other memory of the service provider computers. Alternatively, or in addition, the checks 302, 304, 306, 307 may be received from third-parties such as, but not limited to, the third-party check provider computers 117. As such, in some examples, the service provider computers 110 may act as third-party check marketplace. In this way, users 102 may review, rate, purchase, utilize, or otherwise select one or more of the checks 302, 304, 306, 307 provided by the third-party check provider computers 117. In at least one example, the service provider computers 110 may only provide checks from third-parties for use by users 102. In other examples, the service provider computers 110 may only provide best practice checks that are determined or otherwise created by the service provider computers 110 themselves. However, in other examples, the service provider computers 110 may provide both third-party checks and service provider generated checks.

Additionally, in some aspects, once the resource advisor 148 has determined and/or received the best practice checks 302, 304, 306, 307, the resource advisor 148 may receive selection of one or more checks 302, 304, 306, 307 to be utilized or it may determine, based at least in part on user settings and/or preferences, one or more checks 302, 304, 306, 307 to be utilized. The resource advisor 148 may then collect usage and/or configuration information associated with the user's system, the user's account, and/or particular setup of the web service provided by the service provider 110. In some examples, the resource advisor 148 may collect usage and/or configuration information by scraping, polling, querying, or otherwise analyzing a client log 308 of the client instance 142. The client log 308 may include information associated with an account configuration or it may include information associated with API calls placed by the client instance 142 and/or a user 102 of the service provider computers 110.

In some examples, the resource advisor 148 may collect usage and/or configuration information by receiving API calls as they are made. The API calls may be made by the client instance 142, the service provider computers 110, and/or the user devices 104 of FIG. 1. Alternatively, or in addition, the resource advisor 148 may scrape, poll, query, or otherwise collect data 312 directly from the data set 146. As such, the resource advisor 148 may collect information from multiple different data sets, data volumes, databases, or other storage systems associated with the web service account being analyzed.

In some cases, the resource advisor may provide feedback 314 to the third-party check provider computers 117. The feedback 314 may include, but is not limited to, appropriate usage data such as that collected at 308, 310, 312. The feedback 314 may also be selected or otherwise provided to the third-party check provider computers 117 based at least in part on a configuration setting of the service provider computers 110 and/or set by the third-party check provider computers 117. Additionally, in some examples, the resource advisor 148 may provide remediation 316 to a client instance 142 based at least in part on the resource allocation advise, best practice recommendations, service and/or cost performance optimizations provided to the one or more customers of a web service (e.g., hosted by the service provider computers 110). That is, the remediation 316 may be an instruction for remediation of a problem discovered, an instruction for performing the best practice advice or recommendation, and/or automatic remediation of the foregoing, or the like. Further, the remediation 316 may also be based at least in part on a customer and/or instance 140 setting. For example, a customer may provide a setting to indicate that if a particular issues arises more than once, twice, three times, etc., that the resource advisor should automatically remediate 316 the problem (in some cases, based at least in part on the best practice advice and/or recommendation).

Figure 4:
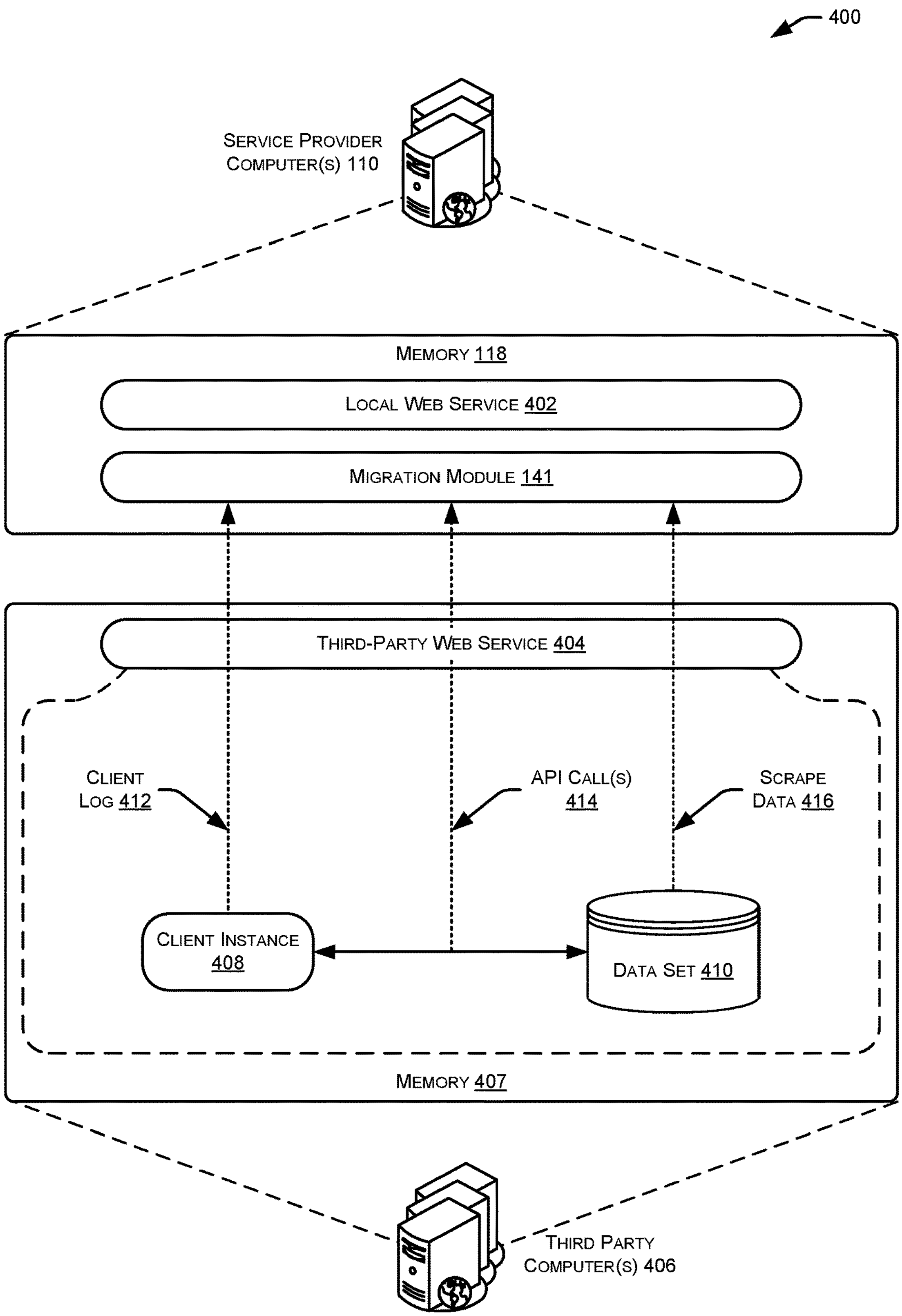

FIG. 4 depicts an example block diagram 400 illustrating aspects and/or features of the example architecture 100 of FIG. 1 in which techniques for resource allocation advisement may be implemented. In the block diagram 400, aspects of the disclosure are shown again with reference to one or more distributed servers such as, but not limited to, the service provider computers 110 of FIG. 1. In some aspects, as noted above, the service provider computers 110 may include at least one memory 118 for storing program modules such as, but not limited to, a migration module 141 and/or a local web service module 402. In some examples, the local web service 402 may provide web hosting, virtual machine instantiating (e.g., cloud computing), remote data storage, combinations of the foregoing, and the like. Additionally, the migration module 141 may be configured to aid customers with potentially migrating systems to the local web service 402 and/or to other web services. As such, the migration module 141 may determine, based at least in part on best practice checks (e.g., as discussed above), how, when, and/or why to migrate from a system serviced by a third-party web service 404 (e.g., hosted by a third-party computer 406 and/or stored within at least one memory 407 of the third-party computer 406) to the local web service 402.

In some examples, performing the best practice checks, determining whether to migrate, providing migration recommendations, and/or providing cost savings information associated with migration may be based at least in part on information received from the third-party computers 406 or resources of the third-party computers 406 such as the third-party web service 404. For example, the third-party web service 404 may operate by providing one or more client instances 408 and/or one or more data sets 410. In some aspects, the data set 410 may be operationally attached to the client instance 408, such that the client instance 408 may access, read from, and/or write to the data set 410. As such, resource allocation information, resource usage information, and/or configuration information associated with the web service may be received or otherwise collected by the third-party web service 404 and/or the migration module 141 via at least one of a client log 412, API call(s) 414, and/or data scraped 416 from the one or more data sets 410. That is, in some examples, the resource and/or configuration information may be collected by the third-party web service and provided to the migration module 141. However, in other examples, the information may be received directly by the migration module 141. Yet, in other examples, some information may be received by the migration module 141 from the web service resources (i.e., the client instance(s) 408 and/or data set(s) 410) while some other information may be received by the migration module 141 from the third-party web service 404.

In some examples, once the migration module 141 collects at least some resource usage and/or configuration information, the migration module 141 may determine, based at least in part on the received information and/or one or more best practice checks, whether or not to migrate the account to the local web service 402 or to some other web service (e.g., other than third-party web service 404). In some examples, the migration module 141 may make a migration recommendation. In some examples, the migration module 141 may provide a cost estimate for migrating. In some examples, the migration module 141 may provide configuration information associated with the local web service 402 for indicating how the local web service 402 might be set up in order to maximize and/or optimize the type of web service that was being provided by the third-party web service 404. Further, in some examples, the migration module may perform automatic migration based at least in part on one or more user settings and/or preferences.

Figure 5:
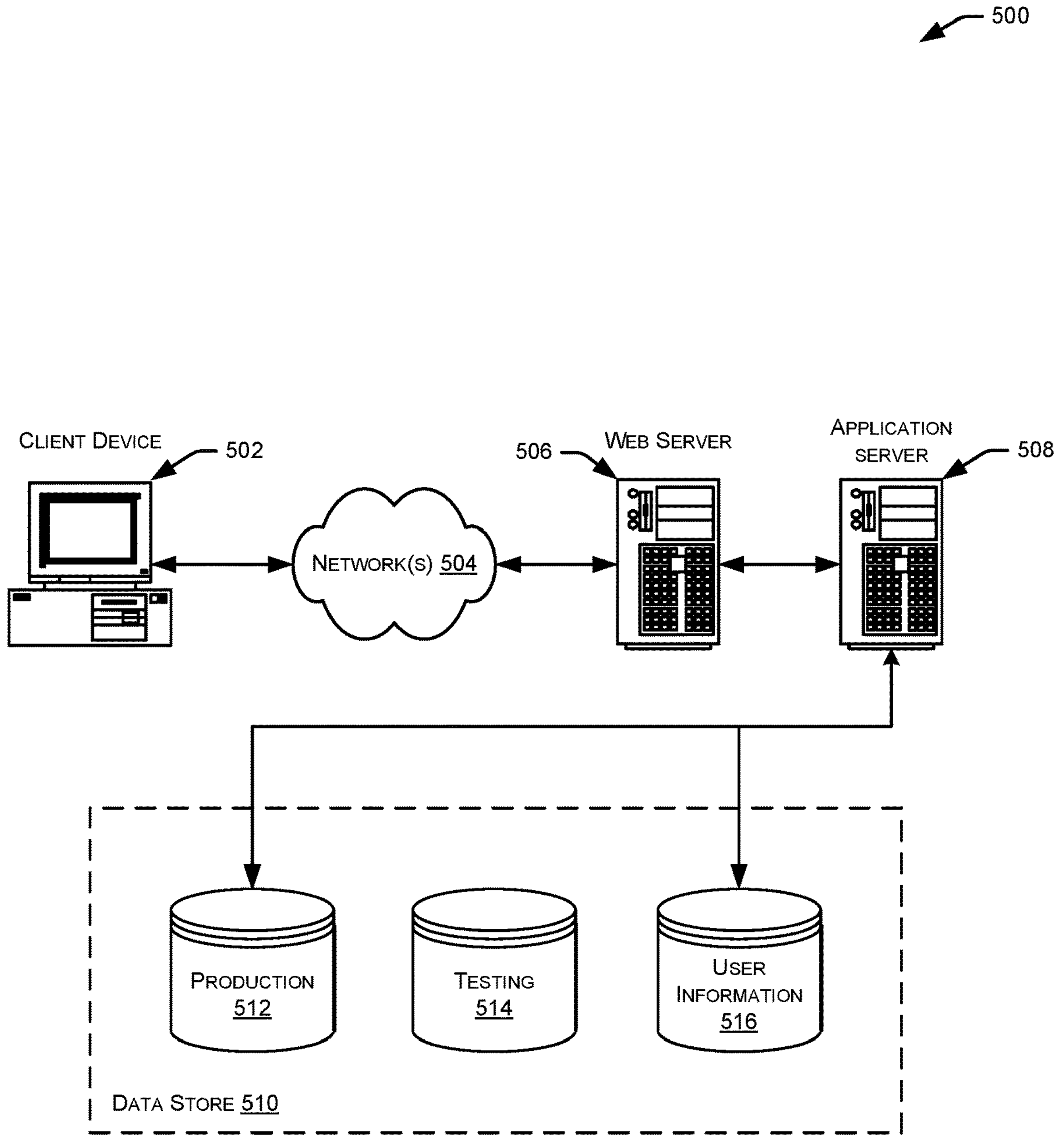
FIG. 5 illustrates an example block diagram of at least one environment in which various embodiments of features described herein can be implemented, according to at least one example.

FIG. 5 illustrates aspects of an example environment 500 for implementing aspects in accordance with various embodiments. As will be appreciated, although a web-based environment is used for purposes of explanation, different environments may be used, as appropriate, to implement various embodiments. The environment includes an electronic client device 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and computer-executable instructions for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the web server in the form of HTML, XML, or another appropriate structured language in this example. The handling of all requests and responses, as well as the delivery of content between the client device 502 and the application server 508, can be handled by the web server. It should be understood that the web and application servers are not required and are merely example components, as structured code discussed herein can be executed on any appropriate device or host machine as discussed elsewhere herein.

The data store 510 can include several separate data tables, databases, or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 510. The data store 510 is operable, through logic associated therewith, to receive instructions from the application server 508 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 502. Information for a particular item of interest can be viewed in a dedicated page or window of the browser.

Each server typically may include an operating system that provides executable program instructions for the general administration and operation of that server, and typically may include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile applications and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more web applications that may be implemented as one or more scripts or programs written in any programming language, such as Javan, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically may include a number of computer-executable applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, computer instructions (including portable applications, such as applets), or both. Further, connection to other computing devices such as network input/output devices may be employed.

Storage media and computer readable media for containing code, or portions of code, can include any appropriate media known or used in the art, including storage media and communication media, such as but not leveled to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Further, the example architectures, tools, and computing devices shown in FIGS. 1-5 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 6-21 illustrate example flow diagrams showing respective processes 600-2100 for providing resource allocation advice and/or optimization recommendations. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 6:
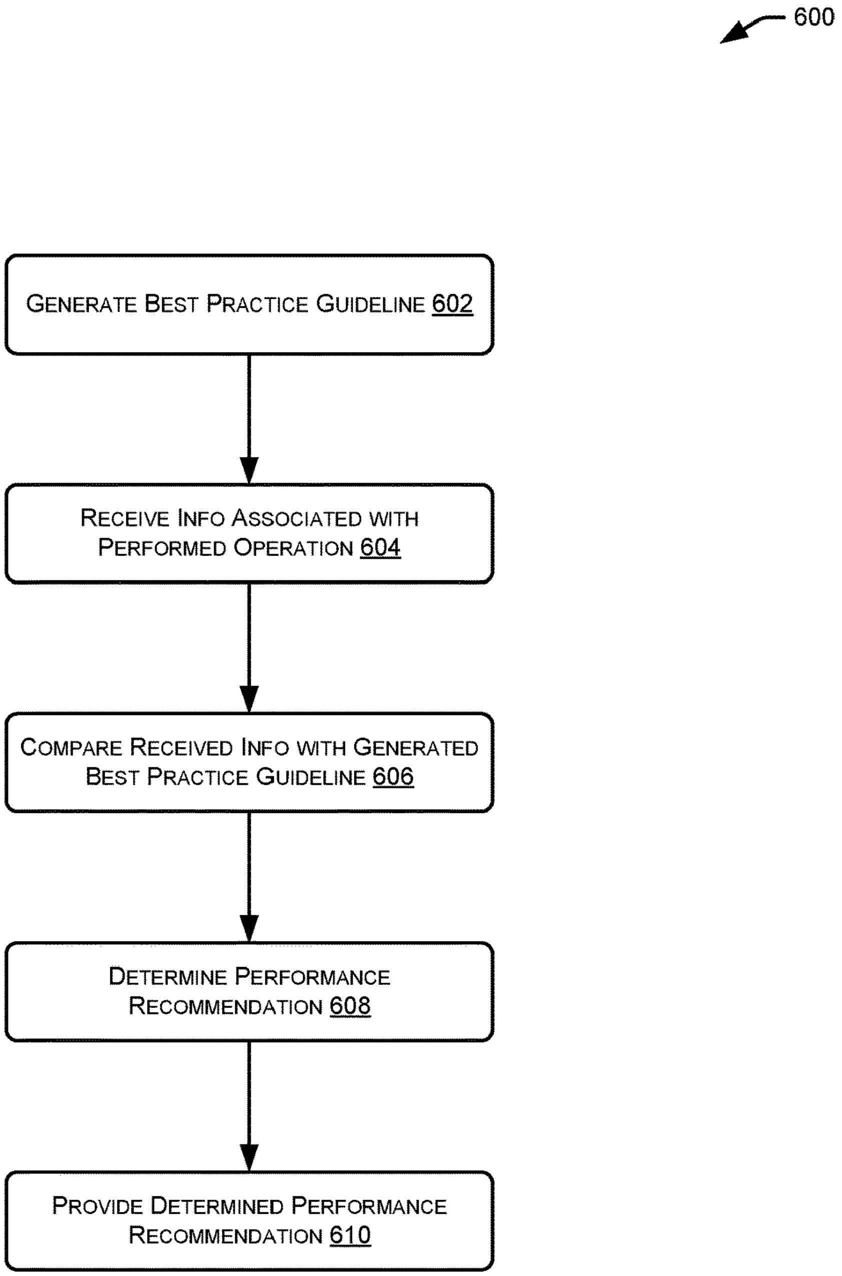
FIGS. 6-21 illustrate example flow diagrams of processes for implementing at least some features of the resource allocation advisement described herein, according to at least a few examples.

In some aspects, the process 600 of FIG. 6 may be performed by the one or more service provider computers 110, the one or more user devices 104, and/or the one or more third-party computers 116 shown in FIG. 1. The process 600 may begin by generating a best practice guideline for operating a system, web service, and/or device at 602. As noted above, in some examples, best practice guidelines, configuration checks, tests, and/or rules may be utilized to determine whether the system, web service, and/or device are being operated in an optimized fashion. Thus, in some cases, at 602, the process 600 may generate, derive, and/or otherwise create one or more best practice guidelines. These guidelines may refer to the system as a whole or to a particular component of the system. For example, one guideline may be utilized for checking the age of data in a storage device (e.g., in a backup or snapshot) and/or the dirtiness of data in a storage device (i.e., how much data has changed since the last data backup). Additionally, one guideline may be utilized for checking a more general setting or efficiency of the system, as opposed to being directed to a particular component (like the data storage device noted in the previous example). In one non-limiting example, the guideline may indicate that a load balancer should spread web requests throughout more than one availability zones. An availability zone may include one or more physical locations where resources may be stored and/or hosted by a service provider At 604, the process 600 may receive information associated with a performed operation. For example, the process 600 may receive data from a client entity (e.g., a virtual machine instance operating on behalf of a user) and/or an attached data store (e.g., a storage device operationally accessible to the client entity). The information associated with the performed operation may include virtual instance information, data storage information, and/or configuration or setting information associated with how the user is utilizing the web service to provide a web site or other service to customers of the user. For example, the received information may include an indication that a load balancer of the web service is using only one availability zone. The process may then compare the received information with the generated best practice guideline at 606. In this example, the comparison may indicate that the received information does not match the guideline. That is, the guideline specifies that more than one availability zone should be used; however, the received information indicates that only one availability zone is being used. The process 600 may then determine a performance recommendation at 608. Here, in this non-limiting example, the performance recommendation may be to begin using more than one availability zone, as specified by the guideline. Thus, the process 600 may end at 610, by providing the determined performance recommendation (i.e., an indication that it is recommended for the load balancer to be set to spread instances over multiple availability zones) to a user or account.

Figure 7:
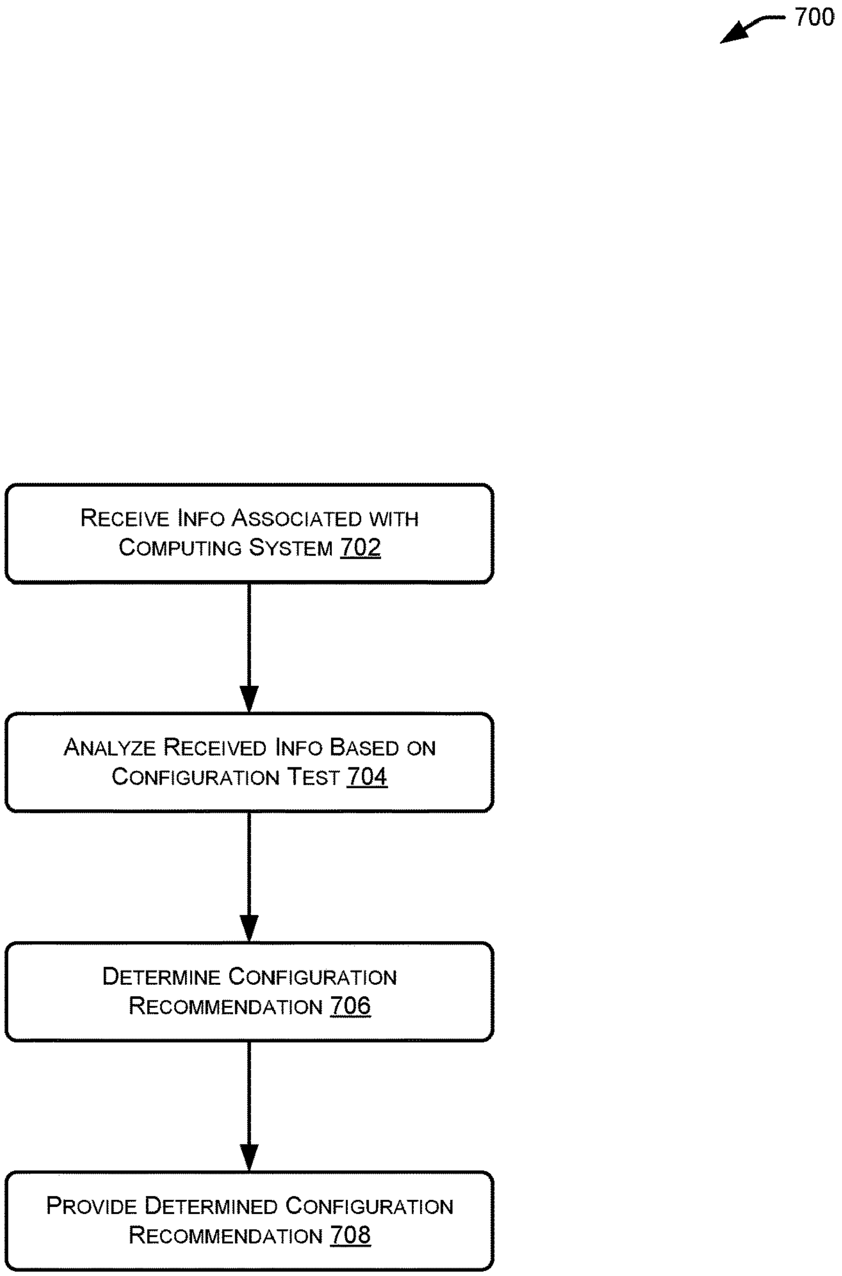

FIG. 7 illustrates an example flow diagram showing process 700 for providing resource allocation advice and/or optimization recommendations. In some aspects, the process 700 of FIG. 7 may be performed by the one or more service provider computers 110, the one or more user devices 104, and/or the one or more third-party computers 116 shown in FIG. 1. The process 700 may begin by receiving information associated with a computing system at 702. In some examples, the computing system may include, but is not limited to, a distributed computing system for providing web services and/or cloud-based services to users. As such, the received information may be information associated with a component of the computing system (such as, but not limited to, a client entity or a data storage device). Additionally, the received information may also be configuration information associated with an account of a user utilizing a web service to provide a web site or other web application to a customer.

In some examples, the process 700 may analyze the received information based on one or more configuration tests at 704. As noted above, a configuration test may include one or more best practice rules associated with configuration of a system. For example, historical information associated with optimized web services, optimized virtual machine instances, and/or optimized data storage may be utilized to generate one or more configuration tests. One non-limiting example of a configuration test may be to determine, based at least in part on geo-location information, when it is appropriate to move resources to one or more additional locations (e.g., to add redundancy to data storage and/or to spread out processing for load balancing). Based on this example, at 704, the process 700 may analyze the received information (which may be geo-location information of a resource) to determine whether resources should be moved to one or more different and/or additional locations. As such, the process 700 may then determine a configuration recommendation at 706. Here, the configuration recommendation may include an indication to move resources. The configuration recommendation may also include one or more configuration settings that would effectively move the resources. Further, the configuration information may also include one or more instructions for moving the resources. At 708, the process 700 may end by providing the determined configuration recommendation to a user associated with the web service being analyzed.

Figure 8:
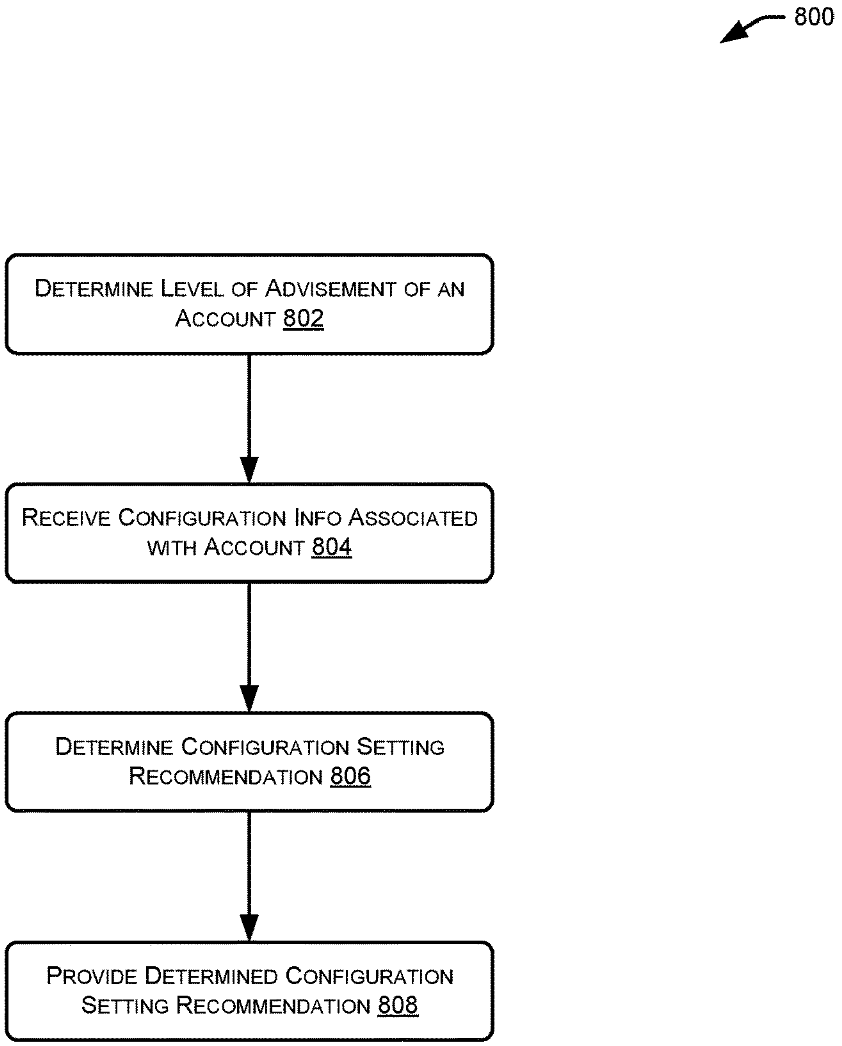

FIG. 8 illustrates an example flow diagram showing process 800 for providing resource allocation advice and/or optimization recommendations. In some aspects, the process 800 of FIG. 8 may be performed by the one or more service provider computers 110, the one or more user devices 104, and/or the one or more third-party computers 116 shown in FIG. 1. The process 800 may begin by determining a level of advisement of an account at 802. The level of advisement, in some examples, may be determined based at least in part on settings and/or preferences provided by a user of the account. Additionally, in some aspects, the level of advisement may indicate how much configuration/resource allocation advice the user would like to receive. The level of advisement also may indicate for which types of resources and/or configurations the user would like to be advised. At 804, the process 800 may receive configuration information associated with the account. As noted above, the configuration information may include, but is not limited to, information associated with a setting, configuration, preference, and/or usage behavior of a distributed system. At 806, the process 800 may determine, based at least in part on the determined level of advisement and/or the received configuration information, one or more configuration setting recommendations. The process 800 may then end at 808 by providing the determined configuration setting recommendation to a user of the account.

Figure 9:
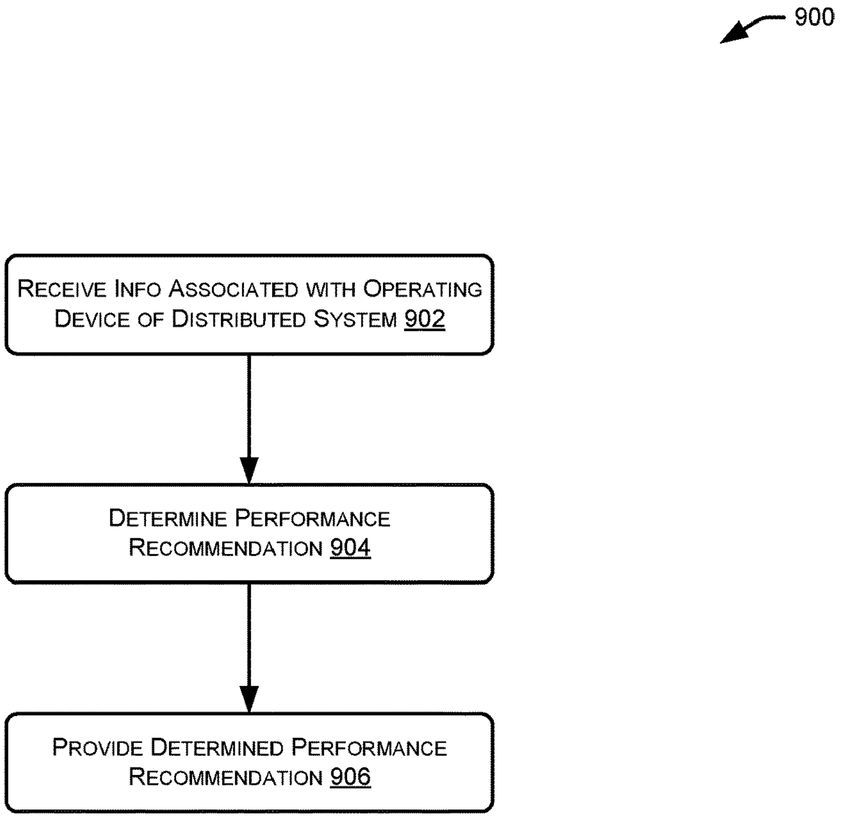

FIG. 9 illustrates an example flow diagram showing process 900 for providing resource allocation advice and/or optimization recommendations. In some aspects, the process 900 of FIG. 9 may be performed by the one or more service provider computers 110, the one or more user devices 104, and/or the one or more third-party computers 116 shown in FIG. 1. The process 900 may begin by receiving information associated with operating a device of a distributed system at 902. In some aspects, the device may include, but is not limited to, a virtual client instance, a storage device, a network interface card, etc. At 904, the process 900 may determine a performance recommendation to a user of the distributed system based at least in part on the received information and one or more best practice guidelines, checks, tests, rules, or the like. Based at least in part on the outcome of the one or more best practice checks, the process 900 may end at 906 by providing the determined performance recommendation to a user of the account or to the account.

Figure 10:
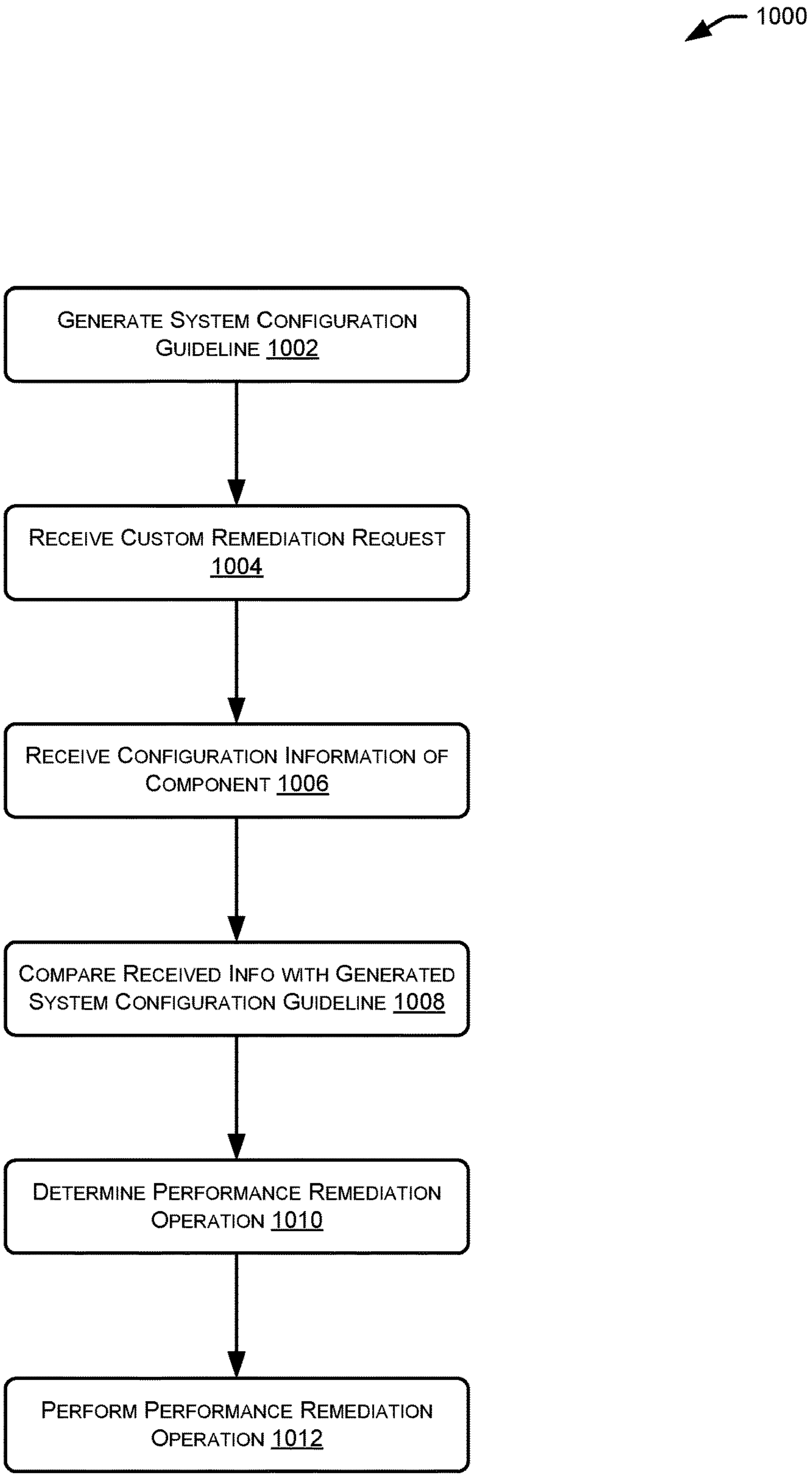

FIG. 10 illustrates an example flow diagram showing process 1000 for providing resource allocation advice and/or optimization recommendations. In some aspects, the process 1000 of FIG. 10 may be performed by the one or more service provider computers 110, the one or more user devices 104, and/or the one or more third-party computers 116 shown in FIG. 1. The process 1000 may begin by generating one or more system configuration guidelines for optimized performance of a distributed system at 1002. The distributed system may, in some examples host a web service for users of an account. The process 1000 may also receive a custom remediation request from the user at 1004. In some aspects, the custom remediation request may include a request to remediate one or more known problems with the setup of the web service. However, in other aspects, the request may include a request to remediate one or more potential problems and/or may include a request to reduce account costs to the user.

At 1006, the process 1000 may receive configuration information of a component associated with the account. That is, the process 1000 may receive information that indicates account settings, account configurations, and/or account preferences. The process 1000 may then compare the received configuration information with the generated system configuration guidelines at 1008. In some aspects, the process 1000 may only compare received information that matches the custom remediation request from 1004. However, in other examples, the process 1000 may make comparisons for all information that was received, regardless of the custom remediation requests. At 1010, the process 1000 may determine one or more performance remediation operations based at least in part on the outcome of the comparison. In some examples, the process 1000 may only perform performance remediation outcome determinations for resource information that matches the custom requests from 1004. The process 1000 may then end at 1012 by performing the performance remediation operation on the account and/or on resources of the web service that operate on behalf of the account. As such, remediation operations may be performed automatically. Again, the process 1000 may perform only the remediation operations for resources and/or configuration changes that match the custom settings received by the user at 1004. In this way, the user was able to customize what remediation changes are to be performed automatically by the process 1000.

Figure 11:
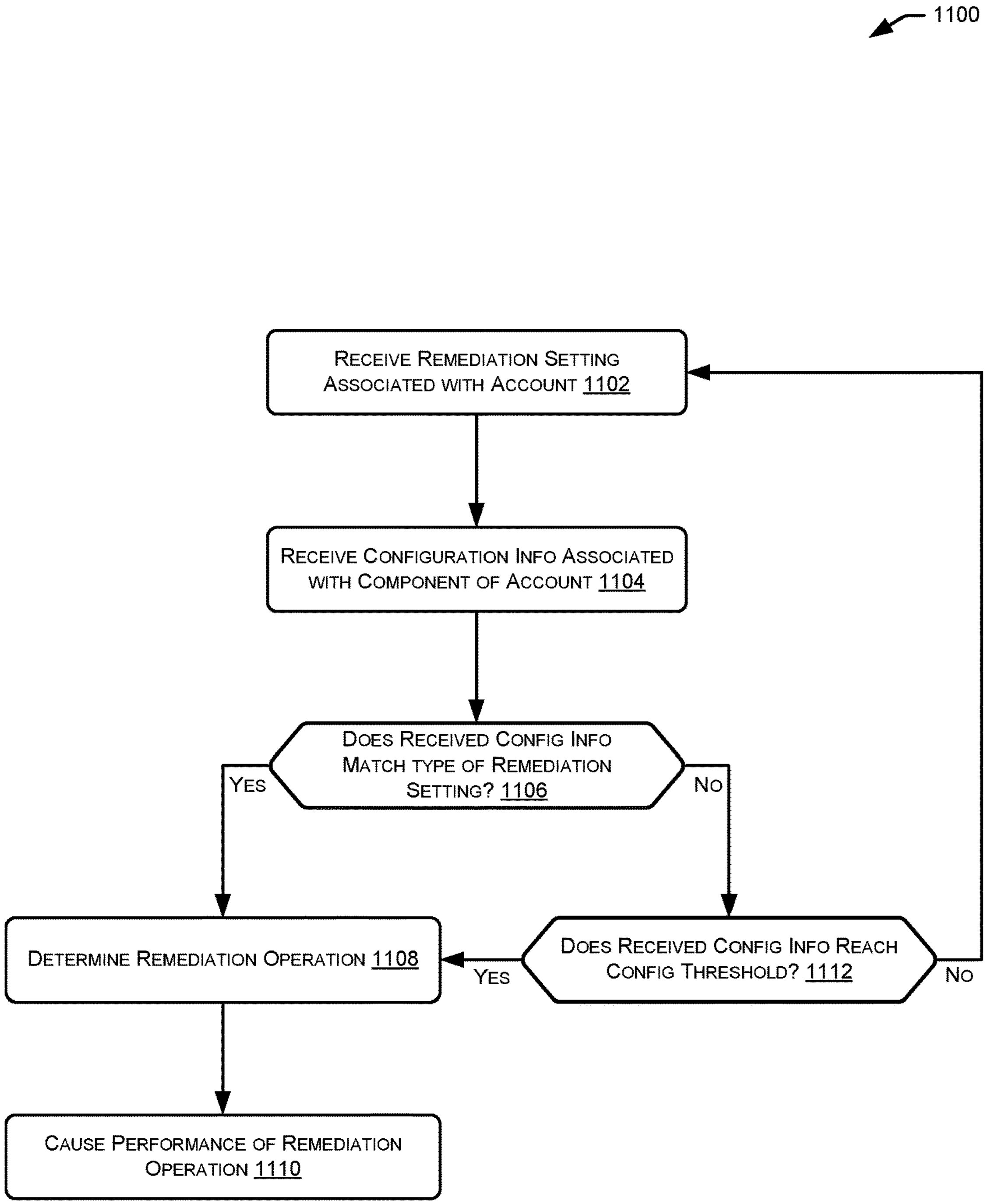

FIG. 11 illustrates an example flow diagram showing process 1100 for providing resource allocation advice and/or optimization recommendations. In some aspects, the process 1100 of FIG. 11 may be performed by the one or more service provider computers 110, the one or more user devices 104, and/or the one or more third-party computers 116 shown in FIG. 1. The process 1100 may begin by receiving one or more remediation settings associated with an account at 1102. In some examples, the remediation settings may be provided by a user of a web service account, such as the one or more users 102 of FIG. 1. Further, in some examples, the remediation setting may indicate a configuration type to be monitored (e.g., health checks, security checks, and/or cost checks) or a configuration threshold against which the configuration information may be measured. The process 1100 may also receive configuration information associated with a component of an account utilizing the web service at 1104. For example, the process 1100 may receive one or more configuration settings of a client instance for processing web requests of a customer (i.e., a customer of a user of the web service) and/or one or more configuration settings of a database utilized by the client instance.

In some examples, the process 1100 may then determine whether the received configuration information matches the configuration type of the remediation setting at 1106. That is, the process 1100 may determine whether the received configuration information is health information, security information, or service information. In one non-limiting example, if the received configuration information indicates that data of a web service is set to be backed up every two days, and the received remediation setting indicates that the user would like to be performing health checks, the process 1100 may determine that the received configuration information matches the type of the remediation setting at 1106. In this case, or in other examples where the process 1100 determines that the received configuration information matches the type of the remediation setting, the process may then determine a remediation operation at 1108 and end by causing (in some examples, automatically) performance of the remediation operation at 1110. In some aspects, determining a remediation operation may include determining a course of action for optimizing, fixing, or otherwise changing the configuration settings of the account to synchronize them with best practice guidelines. Additionally, in some aspects, causing performance of the remediation operation may include sending remediation instructions to the web service provider and/or performing the remediation operation.

However, when the process 1100 determines, at 1106, that the received configuration information does not match the type of the remediation setting (e.g., a health setting, a security setting, and/or a cost setting), the process 1100 may determine whether the received configuration information has reached a configuration threshold at 1112. That is, in some examples, the configuration information may indicate an amount. For example, using the same example as above, the configuration information may indicate that the data is backed up every two days. Thus, here, the 48 hour time between backups may be the amount that is received. Additionally, in one non-limiting example, the threshold may be something closer to 8 hours, or even less. Thus, in this particular case, the 48 would indicate that the threshold was reached or surpassed. Other examples would equally apply. In some examples, when the process 1100 determines that the received configuration information does reach the configuration threshold at 1112, the process 1100 may determine the remediation operation at 1108 and end by causing performance of the remediation operation at 1110. Alternatively, if the process 1100 does not determine that the received configuration information reaches the configuration threshold, the process 1100 may end by returning to 1102 to receive remediation settings again.

Figure 12:
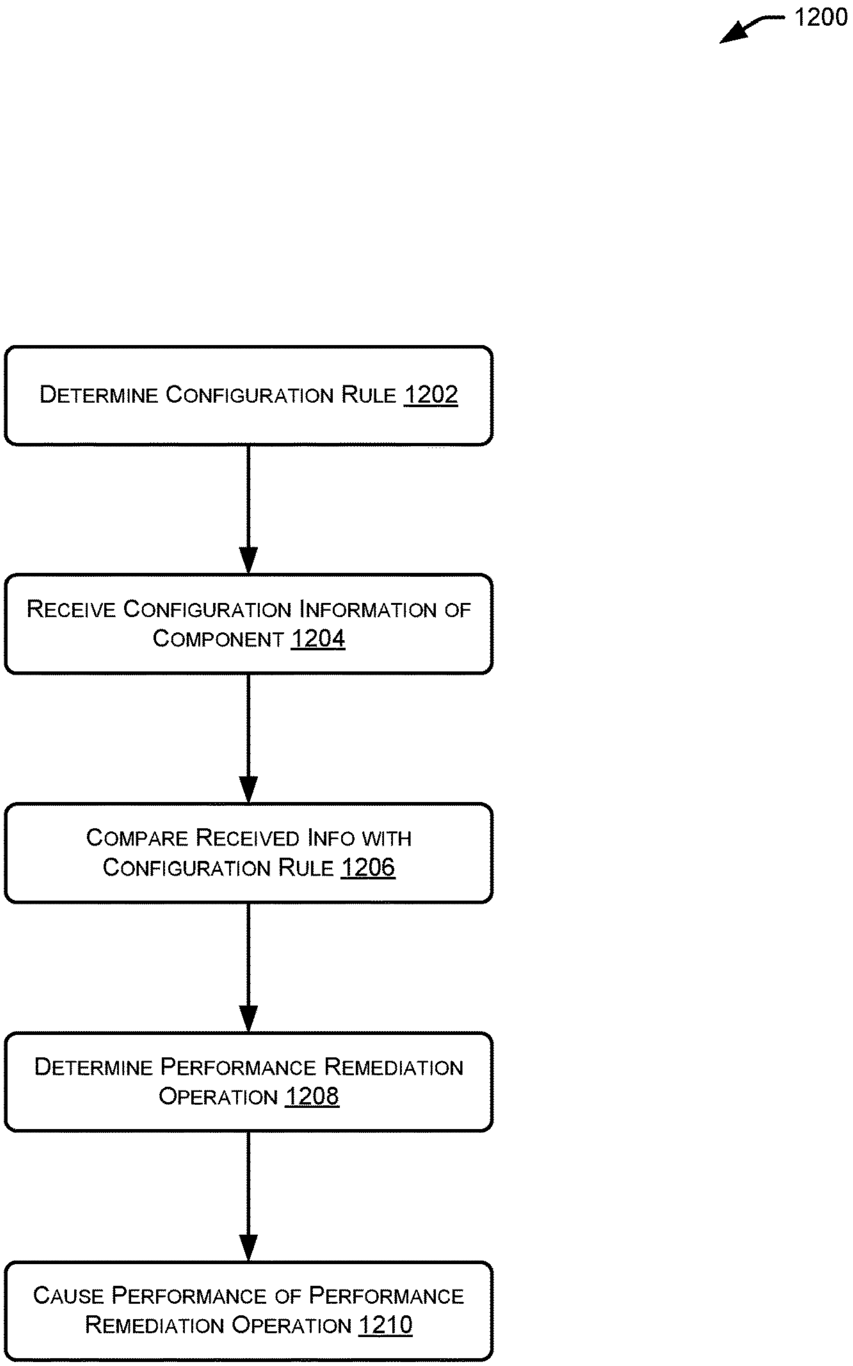

FIG. 12 illustrates an example flow diagram showing process 1200 for providing resource allocation advice and/or optimization recommendations. In some aspects, the process 1200 of FIG. 12 may be performed by the one or more service provider computers 110, the one or more user devices 104, and/or the one or more third-party computers 116 shown in FIG. 1. The process 1200 may begin by determining one or more configuration rules at 1202. In some examples, the configuration rules may also, or alternatively, be received by one or more third-party configuration rule generators. Further, in some examples, the configuration rule may indicate a configuration best practice as determined from historical data, user input, etc. The process 1200 may also receive configuration information associated with a component of an account utilizing a web service at 1204. For example, the process 1200 may receive one or more configuration settings of a client instance for processing web requests of a customer (i.e., a customer of a user of the web service) and/or one or more configuration settings of a database utilized by the client instance. At 1206, the process 1200 may compare the received configuration information with the configuration rule. Based at least in part on the outcome of the comparison, the process 1200 may determine a performance remediation operation at 1208. The process 1200 may end by causing performance of the determined remediation operation at 1210 (which may, in some examples, include automatically performing the operation).

Figure 13:
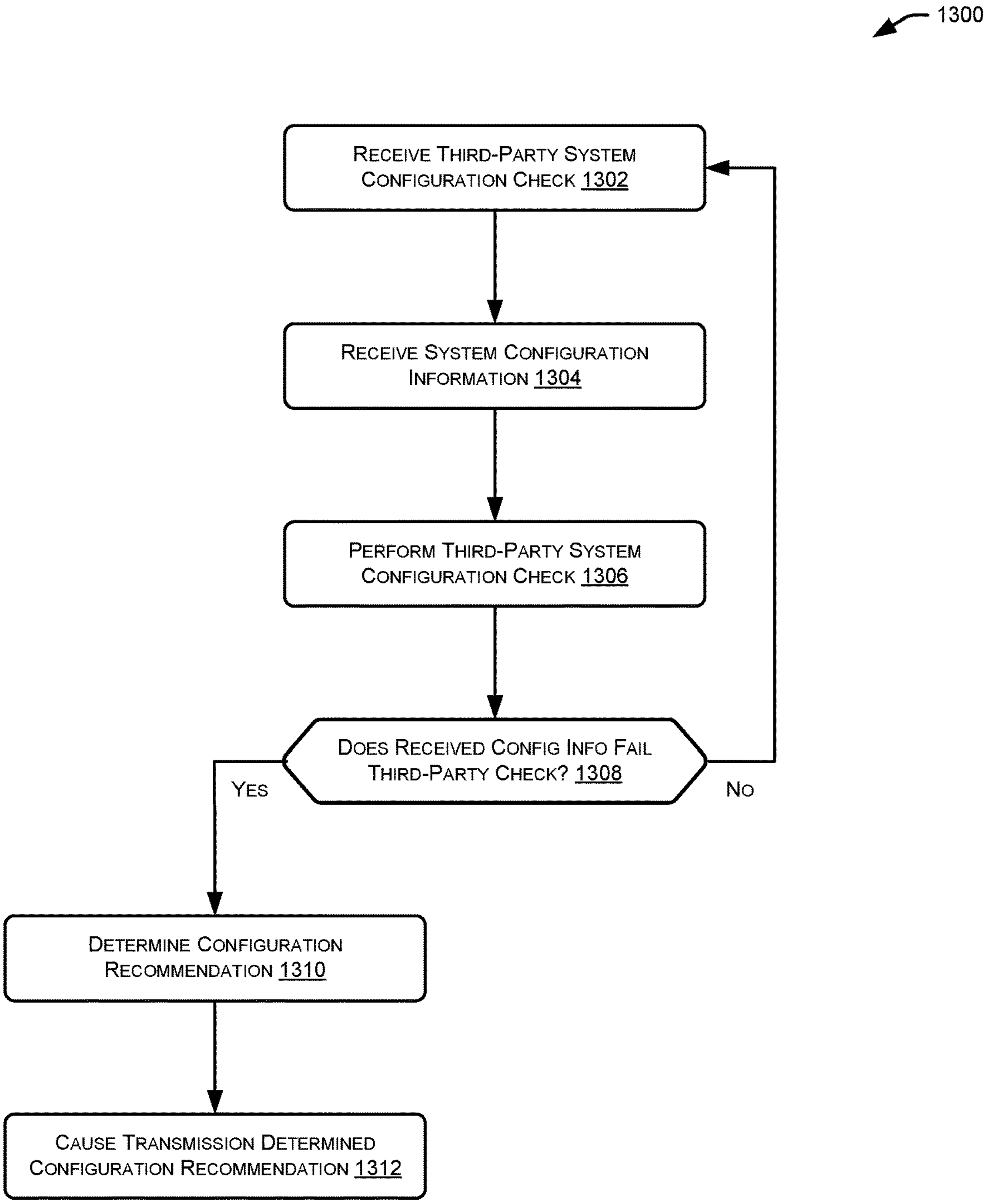

FIG. 13 illustrates an example flow diagram showing process 1300 for providing resource allocation advice and/or optimization recommendations. In some aspects, the process 1300 of FIG. 13 may be performed by the one or more service provider computers 110, the one or more user devices 104, and/or the one or more third-party computers 116 shown in FIG. 1. The process 1300 may begin by receiving one or more third-party system configuration checks at 1302. In some examples, the third-party configuration checks may include one or more of the previously described health checks, security checks, cost checks, or other checks. Additionally, the third-party checks may be generated and/or provided by third-parties such as, but not limited to, the third-party check provider computers 117 of FIG. 1. Further, in some examples, the third-party providers may receive a portion of a fee charged to customers for selecting or otherwise utilizing the third-party checks. The process 1300 may also receive system configuration information associated with an account utilizing a web service at 1304. For example, the process 1300 may receive one or more configuration settings of a client instance for processing web requests of a customer (i.e., a customer of a user of the web service) and/or one or more configuration settings of a database utilized by the client instance.

At 1306, the process 1300 may perform one or more of the third-party checks on the received system configuration information. In some examples, this may include comparing the received system configuration information with information indicated by the third-party checks. The process 1300 may then, in some examples, determine whether the received configuration information fails the third-party checks at 1308. If it is determined that the received configuration information fails the third-party check, the process 1300 may determine a configuration recommendation at 1308. This configuration recommendation may include, but is not limited to, recommending that the account setting be changed to pass the third-party check. In other cases, however, the recommending may include one or more settings recommendations intended to minimize costs or maximize efficiency. The process 1300 may end by causing transmission of the determined configuration recommendation to the user of the account at 1312.

Figure 14:
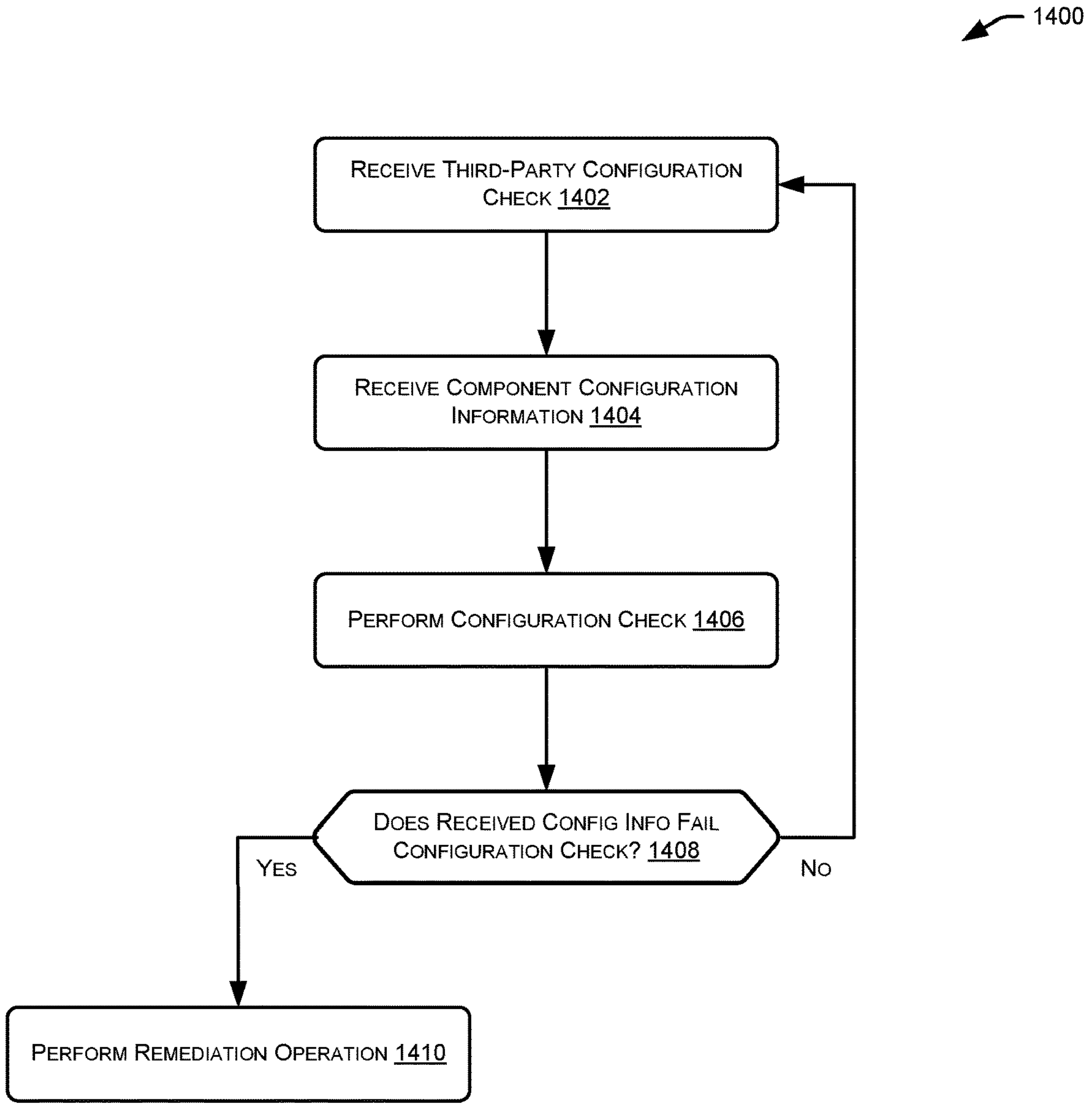

FIG. 14 illustrates an example flow diagram showing process 1400 for providing resource allocation advice and/or optimization recommendations. In some aspects, the process 1400 of FIG. 14 may be performed by the one or more service provider computers 110, the one or more user devices 104, and/or the one or more third-party computers 116 shown in FIG. 1. The process 1400 may begin by receiving one or more third-party system configuration checks at 1402. In some examples, the third-party checks may be generated and/or provided by third-parties such as, but not limited to, the third-party check provider computers 117 of FIG. 1. However, in other examples, both service-provider provided and third-party provided checks may be offered to the user of the account. In this case, the user may be able select from the checks and configure the service provider to perform one or more, or any combination, of service-provider provided checks and/or third-party provided checks. Further, in some examples, a commission may be charged, to the user, when third-party checks are selected. In this case, a portion of the commission may be retained by the service provider. The process 1400 may also receive component configuration information associated with the account of the user at 1404.

At 1406, the process 1400 may perform one or more of the configuration checks (i.e., the service provider system checks, the third-party provider checks, or any combination thereof) on the account based at least in part on the received configuration information. The process 1400 may then determine whether the received configuration information fails or passes the performed configuration checks at 1408. In some examples, when the process 1400 determines that the received configuration information fails the configuration checks at 1408, the process 1400 may end by performing one or more remediation operations at 1410. In some examples, performing the remediation operation may include changing one or more settings of the account such that future received configuration information will not fail the same configuration checks.

Figure 15:
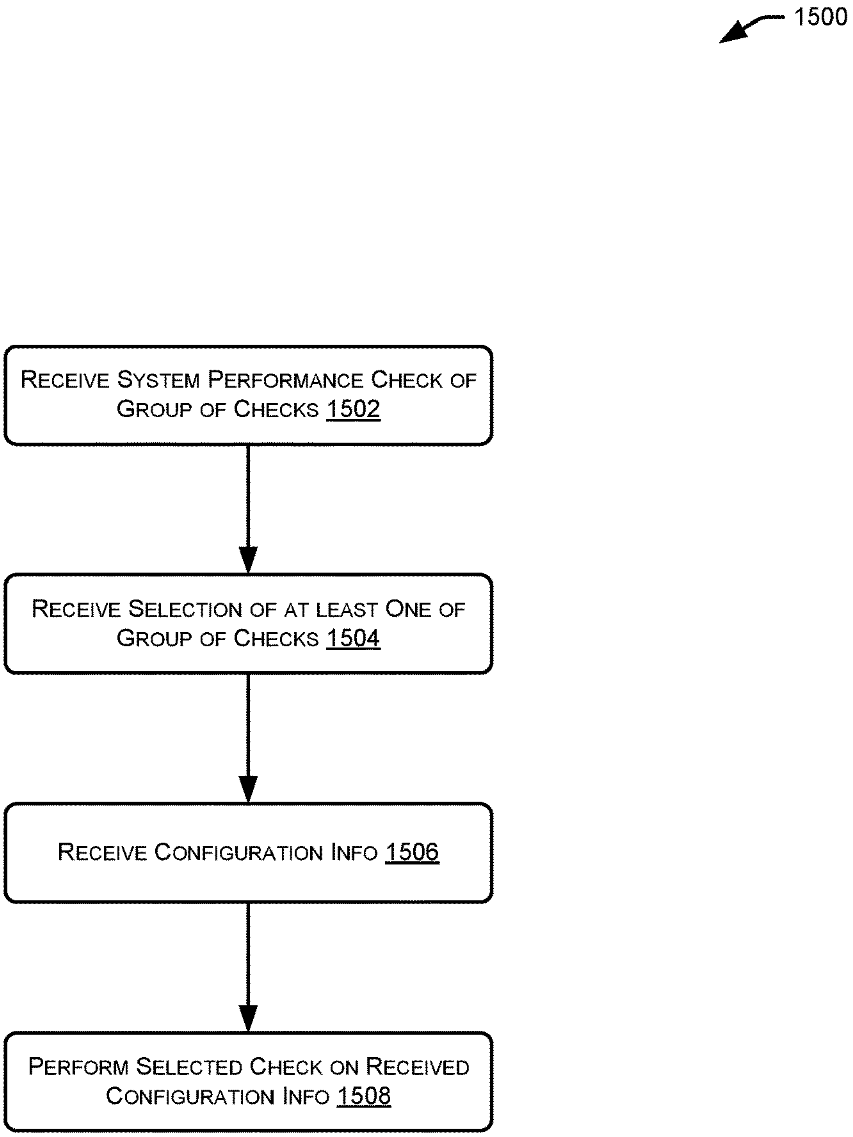

FIG. 15 illustrates an example flow diagram showing process 1500 for providing resource allocation advice and/or optimization recommendations. In some aspects, the process 1500 of FIG. 15 may be performed by at least the one or more service provider computers 110 shown in FIG. 1. The process 1500 may begin by receiving one or more system performance checks at 1502. In some examples, the system performance checks may be from a group of performance checks and/or the group of performance checks may be have been provided to a user for selection. The process 1500 may also receive selection from a user of at least one of the group of performance checks indicating which performance checks the user wishes to be performed on their account. In this way, the performance checks may be customizable by the user. At 1506, the process 1500 may receive configuration information from the account. The process 1500 may then end, at 1508, by performing the selected performance check(s) on the received configuration information.

Figure 16:
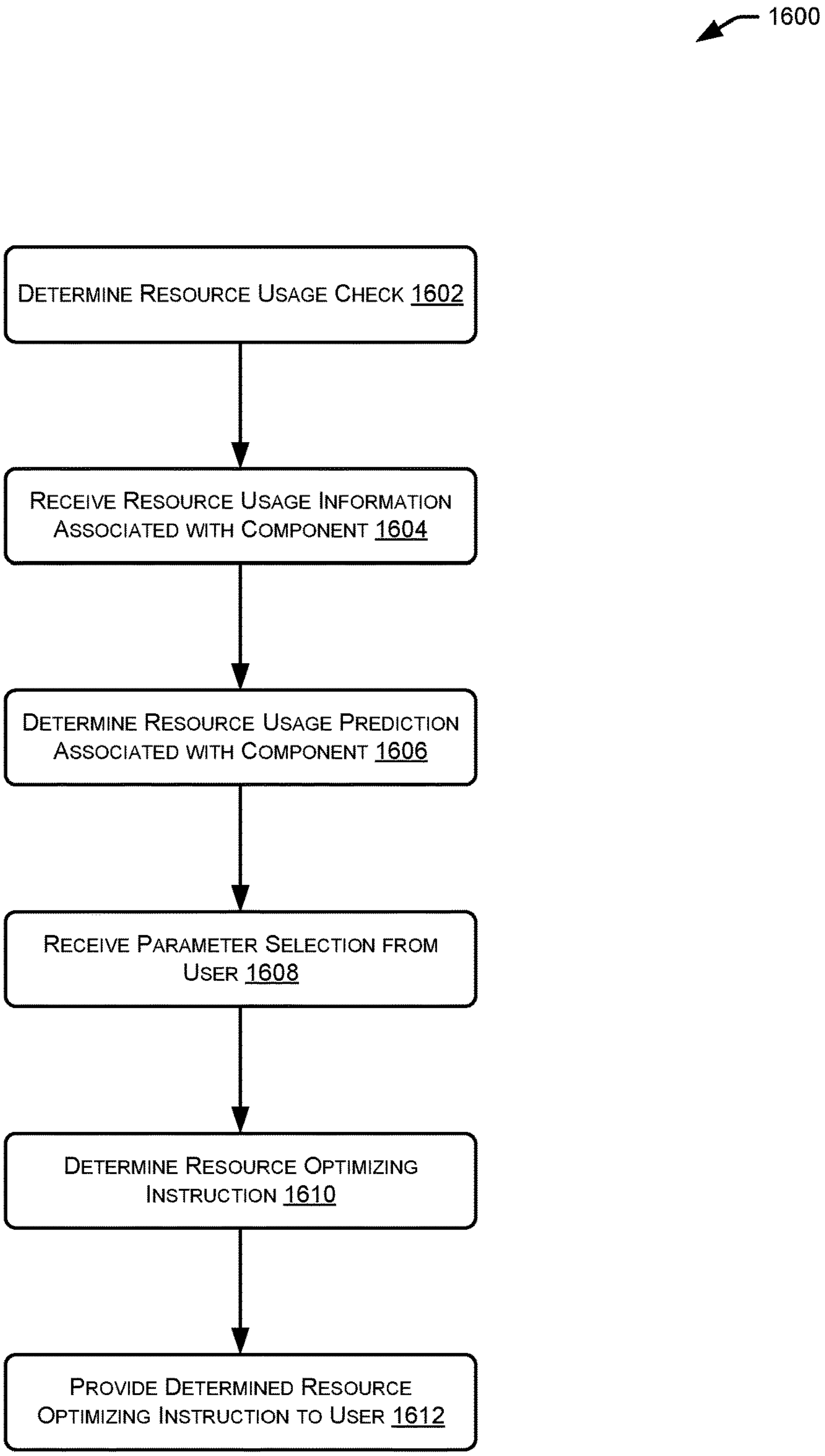

FIG. 16 illustrates an example flow diagram showing process 1600 for providing resource allocation advice and/or optimization recommendations. In some aspects, the process 1600 of FIG. 16 may be performed by at least the one or more service provider computers 110 shown in FIG. 1. The process 1600 may begin by receiving one or more resource usage checks at 1602. Similar to configuration checks (described above), resource usage checks may also be categorized at least as, but not limited to, health checks, security checks, cost checks, etc. However, resource usage checks may determine whether resources are being utilized in an optimized fashion or according to best practices as opposed to configuration checks which may determine whether one or more configuration settings are optimized. The process 1600 may also receive resource usage information associated with a component of a distributed system (e.g., a client instance, a storage device, a network interface, etc.) at 1604. At 1606, the process 1600 may determine one or more resource usage predictions associated with the component of the distributed system. In some examples, the process 1600 may also receive such resource usage predictions from one or more third-parties. Resource usage predictions may, in some aspects, be based on historical information, predictive models, and/or learning models.

The process 1600 may then receive a parameter selection from a user of the distributed system (e.g., a user associated with the component being checked) at 1608. The parameter selection may indicate which prediction model to assume, which resource usage checks to implement, and/or what other preferences the user would like implemented (e.g., whether the user would higher security or data health over cost). At 1610, the process 1600 may determine, based at least in part on the received resource information, the predictions, the user preferences, and/or the resource usage checks, a resource optimizing instruction to be performed. The process 1600 may then end, at 1612, by providing the resource optimizing instruction to the user or by performing the resource optimizing instruction on the account.

Figure 17:
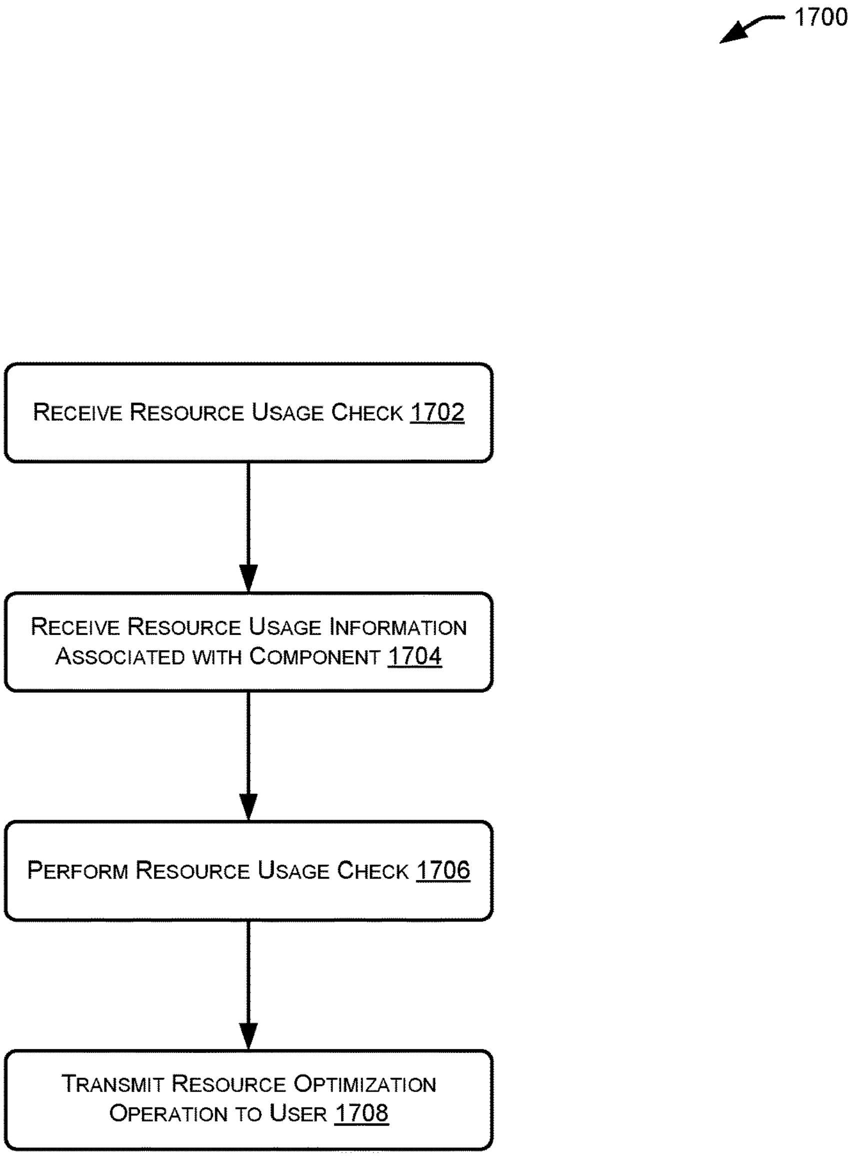

FIG. 17 illustrates an example flow diagram showing process 1700 for providing resource allocation advice and/or optimization recommendations. In some aspects, the process 1700 of FIG. 17 may be performed by the one or more service provider computers 110, the one or more user devices 104, and/or the one or more third-party computers 116 shown in FIG. 1. The process 1700 may begin by receiving one or more resource usage checks at 1702. The process 1700 may also receive resource usage information associated with a component of an account of a user at 1704. In some aspects, the received resource usage information may include how and/or when particular resources are being used. Resources may include, but are not limited to, client instances, data storage devices, backup storage devices, network interface devices, load balancers, etc. The process 1700 may perform the one or more resource usage checks on the received resource usage information at 1706 to determine whether the resources are being used as recommended by the usage checks. At 1708, the process 1700 may end by transmitting the determined resource optimization operation to the user of the account.

Figure 18:
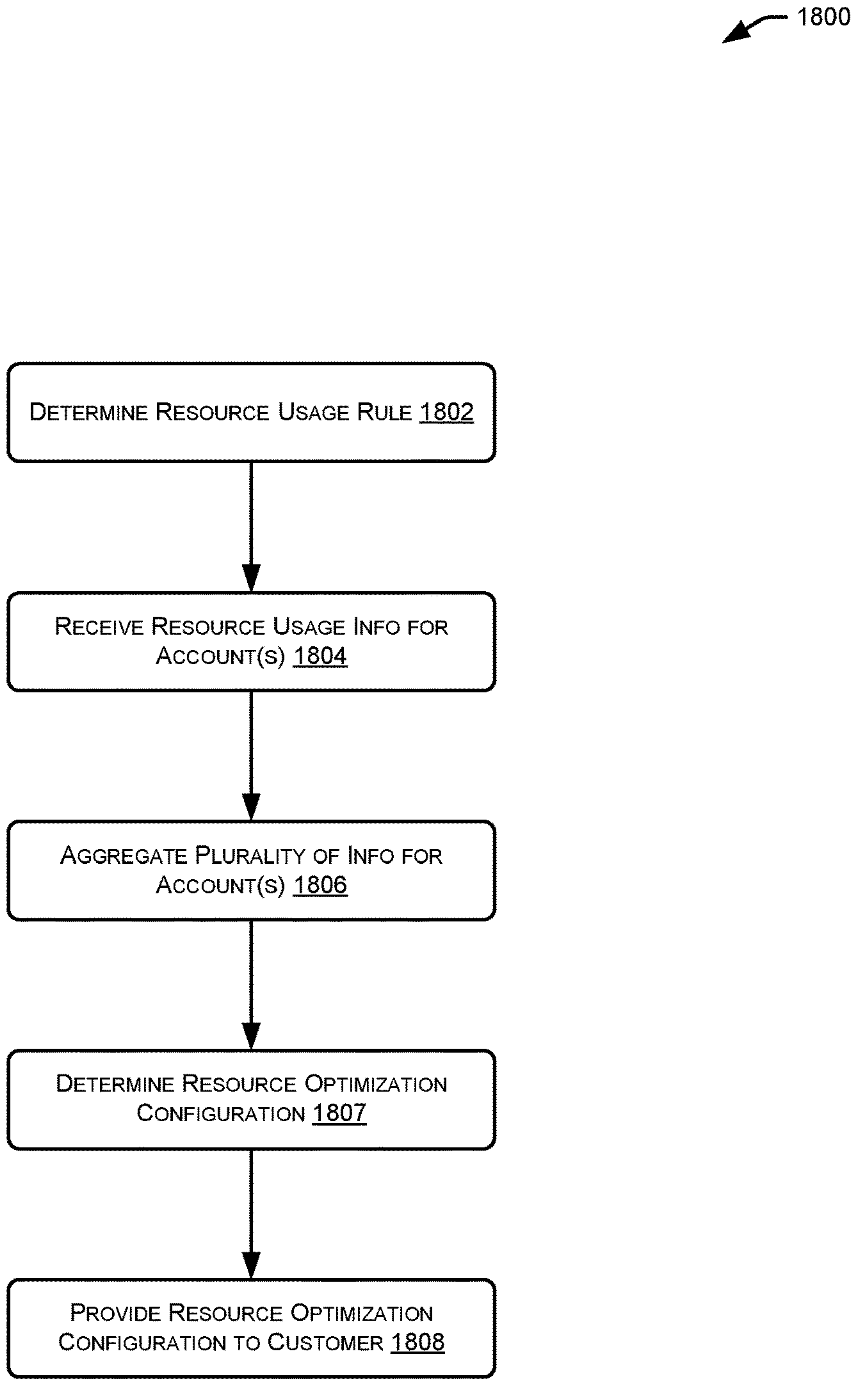

FIG. 18 illustrates an example flow diagram showing process 1800 for providing resource allocation advice and/or optimization recommendations. In some aspects, the process 1800 of FIG. 18 may be performed by at least the one or more service provider computers 110, the one or more user devices 104, and/or the one or more third-party computers 116 shown in FIG. 1. The process 1800 may begin by determining one or more resource usage rules at 1802. A resource usage rule (or best practice resource rule) may be similar to a resource usage check in that they may both indicate similar thresholds or best practice information; however, the rule may not imply that any check is being performed. The process 1800 may also receive resource usage information associated with an account or multiple accounts of a customer at 1804. In some aspects, the received resource usage information may include how and/or when particular resources are being used. Resources may include, but are not limited to, client instances, data storage devices, backup storage devices, network interface devices, load balancers, etc. Further, a single customer may be responsible for or otherwise manage one or more accounts, groups of accounts, and/or subsets of groups of accounts.

The process 1800 may aggregate the received resource usage information for multiple accounts (e.g., in customer assigned or requested groups) at 1806. The process 1800 may determine one or more resource optimization configurations, based at least in part on the received resource usage information and the one or more resource usage rules, at 1807. The determination may be based, in part, on a type of reserved instance being utilized by the customer and/or account. The resource optimization configuration may indicate one or more settings of the account that should be changed to conform with the resource usage rule. At 1808, the process 1800 may end by providing the determined resource optimization configuration to the customer associated with of the account. The optimization configuration may include a number of reserved instances the customer should purchase to maximize cost savings and/or an amount of money to be saved by purchasing one or more (potentially, different types of) reserved instances. In some examples, one or more different methods may be utilized to determine this information. For example, a brute force method may involve calculating or otherwise checking a price for each of a number of instances (potentially of different types) utilized by the customer or an account being checked (or otherwise associated with the customer) during a particular interval.

In other examples, a linear models or optimization algorithms may be utilized to determine the reserved instance recommendations. For example, any multi-variable linear model or algorithm may be used such as, but not limited to, a simplex algorithm or the like. Alternatively, or in addition, a custom algorithm may be utilized. In some examples, the custom algorithm may collect the resource usage information of the one or more accounts and sort the data based at least in part on a predefined criteria. Once sorted, several different data points may be selected for analysis. The selected data points may, in some examples, be compared with a predetermined lookup table, array, or other data structure to determine how many low, medium, or high reserved instances could be purchased for the group of accounts that would provide the lowest possible (or a substantially low) cost basis for the interval being analyzed. Additionally, the results of the algorithm may be provided to the customer. Further, in some examples, the results may be provided to the customer with a user interface that may enable the customer to fill out a customizable order form for purchasing reserved instances, select from one or more recommendations for purchasing reserved instances, and/or make configuration adjustments to the one or more accounts under analysis.

Figure 19:
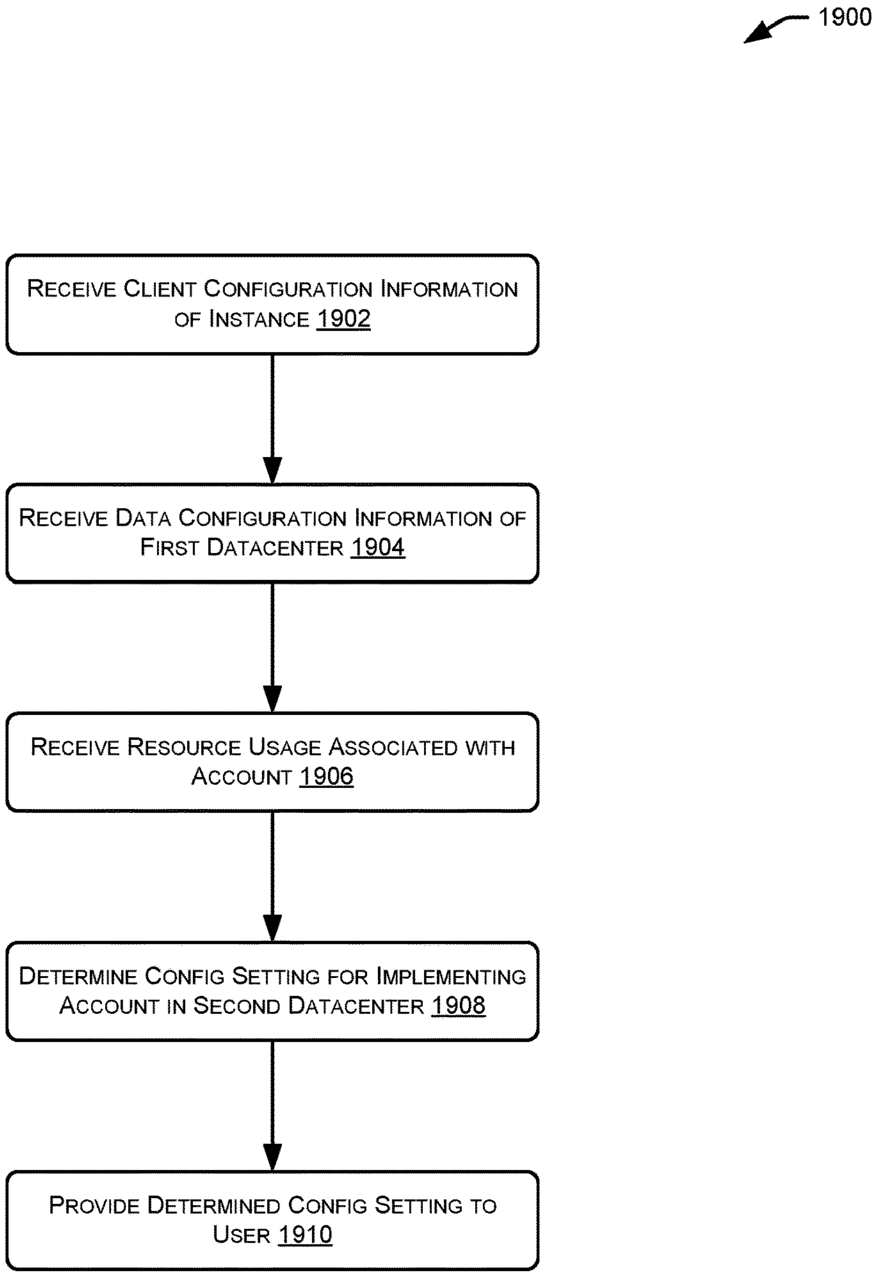

FIG. 19 illustrates an example flow diagram showing process 1900 for providing resource allocation advice, optimization recommendations, and/or migration advice. In some aspects, the process 1900 of FIG. 19 may be performed by at least the one or more service provider computers 110 shown in FIG. 1. The process 1900 may begin by receiving client configuration information of a virtual client instance of a web services account at 1902. The virtual client instance may be hosted by a distributed system or cloud web service provider (e.g., a third-party or other web service provider) and act on behalf of the account or a user of the account. The process 1900 may also receive data configuration information associated with a datacenter operationally attached or otherwise being utilized by the client instance and/or service provider at 1904. In some aspects, the received client and data configuration information may be scraped from the datacenter or determined based at least in part on API calls placed by the client instance and/or the third-party service provider. The process 1900 may also receive resource usage information associated with the account at 1906. This resource usage information may indicate how the resources (i.e., the client instance and/or the datacenter) are being utilized independent of the received configuration information. At 1908, the process 1900 may determine, based at least in part on the received data configuration information, client configuration information, the resource usage information, and/or on or more best practice guidelines, checks, or rules, a configuration setting for implementing the account in a second datacenter. The second datacenter may include one or more relational database management systems (RDBMS) of a distributed system (in some examples, the same distributed system that implements the process 1900). The process 1900 may then end, at 1910, by providing the determined configuration settings (which, in some aspects, indicate how to migrate the account to the RDBMS) to the user.

Figure 20:
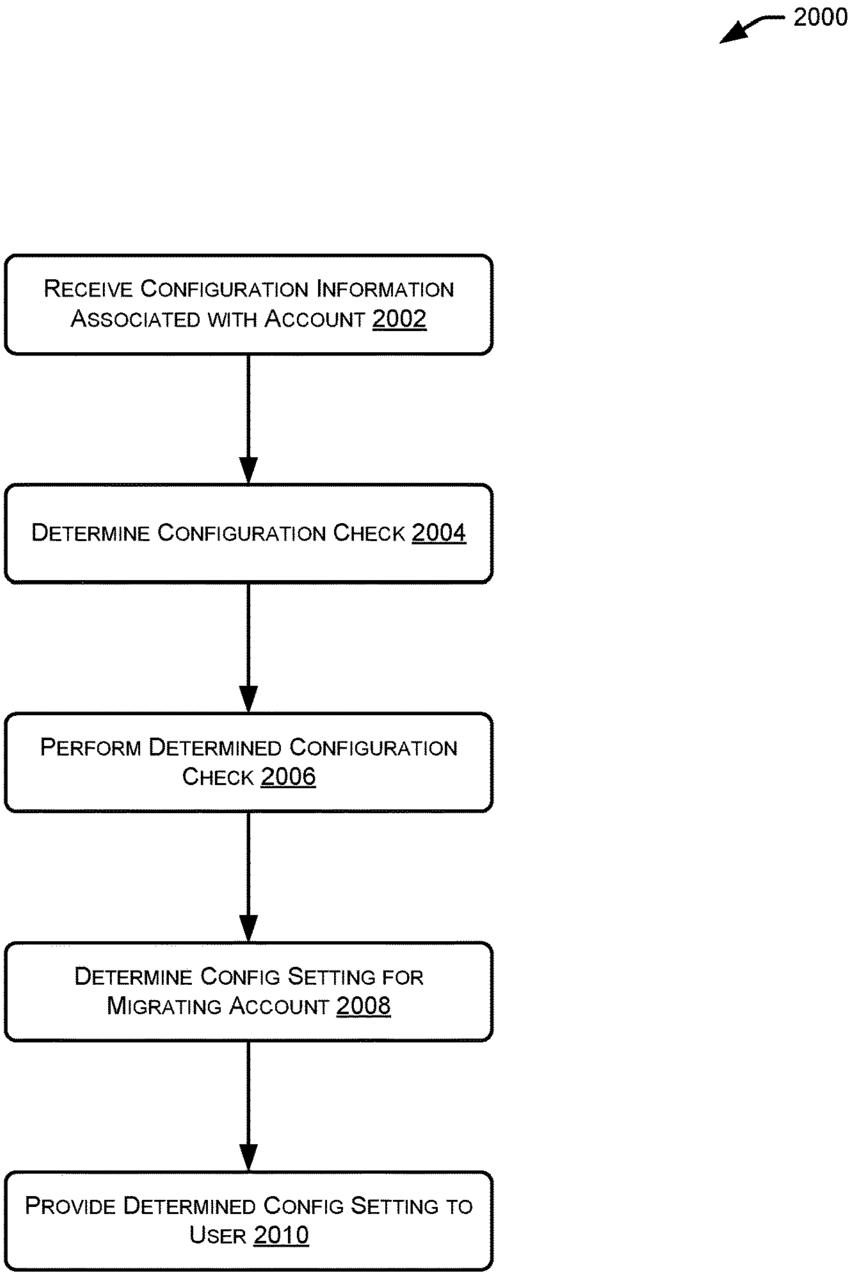

FIG. 20 illustrates an example flow diagram showing process 2000 for providing resource allocation advice, optimization recommendations, and/or migration advice. In some aspects, the process 2000 of FIG. 20 may be performed by at least the one or more service provider computers 110 shown in FIG. 1. The process 2000 may begin by receiving configuration information associated with an account at 2002. The configuration information may be associated with a virtual client instance that may be hosted by a distributed system or cloud web service provider (e.g., a third-party or other web service provider) and act on behalf of the account or a user of the account. The process 2000 may also determine (and/or receive) one or more configuration checks for determining whether the account is optimized and/or following best practices at 2004. The process 2000 may perform the determined (and/or received) configuration check(s) on the received configuration information at 2006. Based at least in part on the outcome of performing the configuration check(s), the process 2000 may determine a configuration setting for migrating the account to a different system (e.g., the service provider computers 110 of FIG. 1). In some examples, the determined configuration settings may indicate one or more computer-executable instructions for performing the migration and/or one or more settings of the target system (i.e., the system to receive the migrated account) to allow for the migration with similar performance as received from the original system (i.e., the system from which to migrate). The process 2000 may then end, at 2010, by providing the determined configuration settings to the user.

Figure 21:
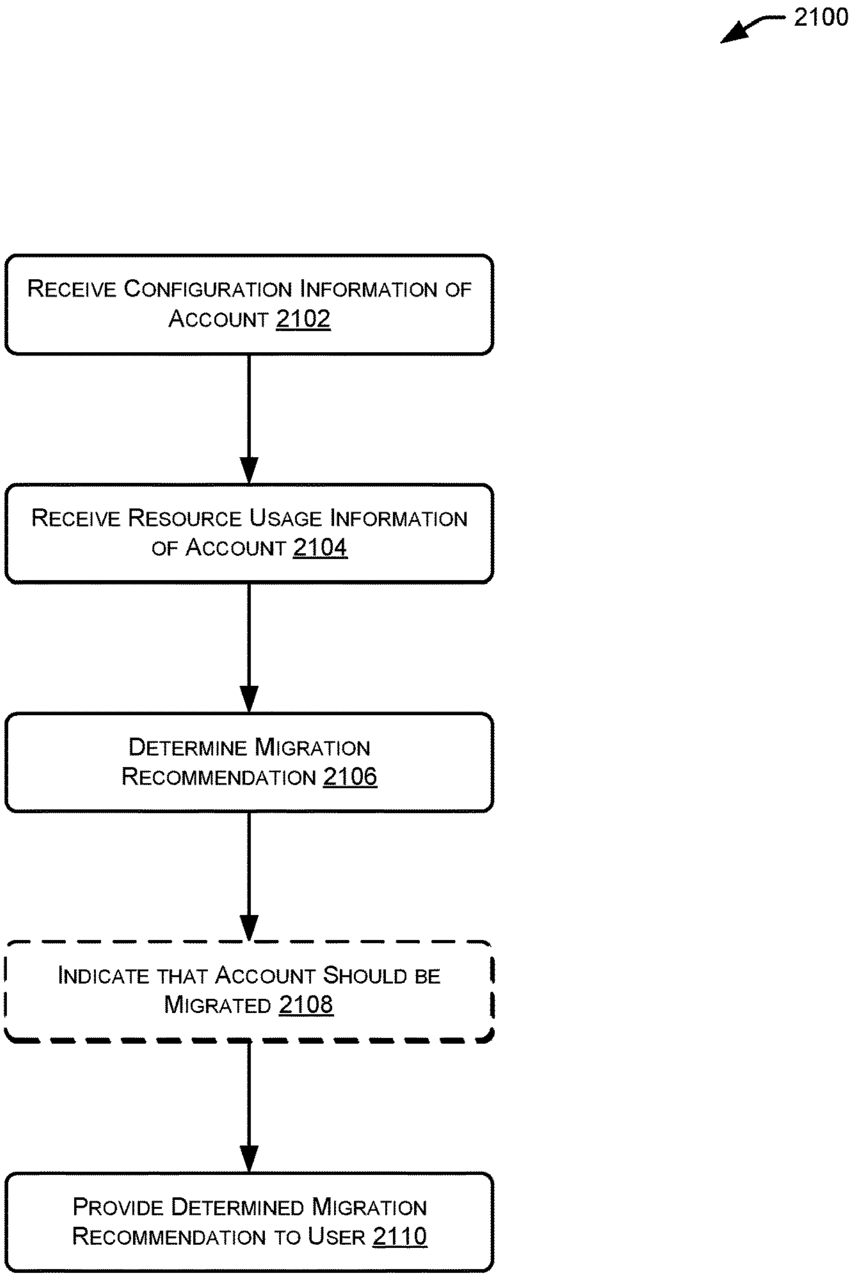

FIG. 21 illustrates an example flow diagram showing process 2100 for providing resource allocation advice, optimization recommendations, and/or migration advice. In some aspects, the process 2100 of FIG. 21 may be performed by at least the one or more service provider computers 110 shown in FIG. 1. The process 2100 may begin by receiving configuration information associated with an account at 2102. The configuration information may be associated with a virtual client instance that may be hosted by a distributed system or cloud web service provider (e.g., a third-party or other web service provider) and act on behalf of the account or a user of the account. Alternatively, the configuration information may be associated with one or more other non-web services and/or non-services (e.g., a laptop, a personal computer, a flash drive, a television, etc.). The process 2100 may also receive resource usage information associated with the account of non-service device at 2104. At 2106, the process 2100 may determine, based at least in part on the received configuration information and the received resource usage information, a migration recommendation. In some aspects the migration recommendation may indicate that the account should be migrated to one or more other services, systems, devices, etc., at 2108. The process 2100 may end, at 2110, by providing the determined migration recommendation to the user.

Illustrative methods and systems for providing resource allocation advice, optimization recommendations, and/or migration advice are described above. Some or all of these systems and methods may, but need not, be implemented at least partially by architectures such as those shown in FIGS. 1-21 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for performance management of a distributed system, comprising:

at least one memory that stores computer-executable instructions; and at least one processor configured to access the at least one memory, wherein the at least one processor is configured to execute the computer-executable instructions to:

determine a level of advisement for an account of the distributed system;

receive configuration information associated with the account, the configuration information including at least one configuration setting associated with a first operation of one or more computer systems implementing a virtual machine operationally attached to a data store, the at least one configuration setting based at least in part on an identification of the first operation of the one or more computer systems associated with one or more characteristics including a stored data distribution, content distribution, a data transfer, a data storage type, a data storage version, or a product usage;

instruct the one or more computer systems implementing the virtual machine of the distributed system to perform a second operation on the operationally attached data store, the second operation being performed on behalf of the account;

receive, from the virtual machine operating on behalf of the account, information associated with the second operation performed on the operationally attached data store;

determine, based at least in part on the information associated with the second operation, the determined level of advisement, and the received configuration information, at least one system configuration setting of the distributed system; and instruct the one or more computer systems to implement the at least one system configuration setting with respect to the operationally attached data store in response to determining the at least one system configuration setting.

2. The system of claim 1, wherein the level of advisement is based at least in part on received profile information associated with usage of the account.

3. The system of claim 2, wherein the profile information indicates whether the usage of the account is in a development stage, a testing stage, or a production stage.

4. The system of claim 1, wherein the configuration information is based at least in part on at least one of an application programming interface (API) stream associated with the virtual machine of the distributed system or information received from the operationally attached data store of the distributed system that is operationally attached to the virtual machine.

5. The system of claim 1, wherein the determination of the at least one system configuration setting is further based at least in part on at least one of a health check associated with data stored for the account, a security check associated with data or network settings of the account, or a cost optimization check associated with the account.

6. One or more non-transitory computer-readable media storing computer-executable instructions for performance management of a distributed system that, when executed by one or more processors, configures the one or more processors to perform operations comprising:

receiving configuration information associated with at least one device implemented by one or more computer systems implementing a virtual machine of the distributed system, the configuration information including at least one configuration setting associated with a first operation of the one or more computer systems implementing the virtual machine, the at least one configuration setting based at least in part on an identification of the first operation of the one or more computer systems associated with one or more characteristics including a stored data distribution, content distribution, data transfer, a data storage type, a data storage version, or a product usage;

receiving information associated with a second operation of the at least one device of the distributed system, the at least one device operating on behalf of an account;

determining, based at least in part on the received information associated with the second operation, the configuration information, and at least one predefined performance rule associated with the distributed system, a performance recommendation associated with the second operation of the at least one device of the distributed system; and instruct the one or more computer systems to implement the performance recommendation for the at least one device of the distributed system.

7. The one or more non-transitory computer-readable media of claim 6, wherein the determined performance recommendation is provided to a user of the account based at least in part on at least one user setting associated with a performance recommendation preference of the user.

8. The one or more non-transitory computer-readable media of claim 6, wherein the configuration information associated with the at least one device of the distributed system is based at least in part on at least one configuration check.

9. The one or more non-transitory computer-readable media of claim 8, wherein the at least one configuration check includes at least one determination associated with data health of a data store of the distributed system.

10. The one or more non-transitory computer-readable media of claim 8, wherein the at least one configuration check includes at least one of a determination associated with data security of a data store of the distributed system or a determination associated with network security of the virtual machine of the distributed system.

11. The one or more non-transitory computer-readable media of claim 8, wherein the at least one configuration check includes at least one of a determination associated with optimizing data storage of a data store of the distributed system, a determination associated with network optimization of the virtual machine of the distributed system, a determination associated with an overall optimization of the distributed system, or a determination associated with optimizing third-party interaction with the distributed system.

12. A computer-implemented method for performance management of a distributed system, comprising:

under control of one or more computer systems configured with executable instructions, determining a level of advisement for an account of the distributed system;

receiving configuration information associated with the account, the configuration information including at least one configuration setting associated with a first operation of one or more computer systems implementing a virtual machine operationally attached to a data store, the at least one configuration setting based at least in part on an identification of the first operation of the one or more computer systems associated with one or more characteristics including a stored data distribution, content distribution, a data transfer, a data storage type, a data storage version, or a product usage;

instructing the one or more computer systems implementing the virtual machine of the distributed system to perform a second operation on the operationally attached data store, the second operation being performed on behalf of the account;

receiving, from the virtual machine operating on behalf of the account, information associated with the second operation performed on the operationally attached data store;

determining, based at least in part on the information associated with the second operation, the determined level of advisement, and the received configuration information, at least one system configuration setting of the distributed system; and instructing the one or more computer systems to implement the at least one system configuration setting with respect to the operationally attached data store in response to determining the at least one system configuration setting.

13. The computer-implemented method of claim 12, wherein the level of advisement is based at least in part on received profile information associated with usage of the account.

14. The computer-implemented method of claim 13, wherein the profile information indicates whether the usage of the account is in a development stage, a testing stage, or a production stage.

15. The computer-implemented method of claim 12, wherein the configuration information is based at least in part on at least one of an application programming interface (API) stream associated with the virtual machine of the distributed system or information received from the operationally attached data store of the distributed system that is operationally attached to the virtual machine.

16. The computer-implemented method of claim 12, wherein the determination of the at least one system configuration setting is further based at least in part on at least one of a health check associated with data stored for the account, a security check associated with data or network settings of the account, or a cost optimization check associated with the account.

17. The computer-implemented method of claim 16, wherein the health check associated with the network settings of the account includes at least identifying one or more network connections associated with the account.

18. The computer-implemented method of claim 12, wherein the configuration information associated with the account is received via a user interface associated with the distributed system.

19. The computer-implemented method of claim 12, wherein the at least one system configuration setting includes a resource allocation recommendation.

20. The system of claim 5, wherein the health check associated with the network settings of the account includes at least identifying one or more network connections associated with the account.

* * * * *